United States Patent [19]
Tanaka et al.

[11] Patent Number: 6,126,341
[45] Date of Patent: Oct. 3, 2000

[54] SERIAL RECORDING APPARATUS AND METHOD

[75] Inventors: Minoru Tanaka; Kiyofumi Koike, both of Nagano, Japan

[73] Assignee: Seiko Epson Corporation, Tokyo, Japan

[21] Appl. No.: 09/084,426

[22] Filed: May 27, 1998

[30] Foreign Application Priority Data

| May 28, 1997 | [JP] | Japan | ................................... 9-154432 |
| Apr. 21, 1998 | [JP] | Japan | ................................. 10-110572 |

[51] Int. Cl.⁷ ....................................................... B41J 3/42
[52] U.S. Cl. .................................. 400/74; 400/76; 400/70; 400/61
[58] Field of Search ................................. 346/1.1; 347/2; 400/74, 76, 70, 61

[56] References Cited

U.S. PATENT DOCUMENTS

| 5,124,720 | 6/1992 | Schantz | ..................................... 346/1.1 |
| 5,781,202 | 7/1998 | Silverbrook | ................................. 347/3 |
| 5,859,652 | 1/1999 | Silverbrook | ................................. 347/2 |

FOREIGN PATENT DOCUMENTS

| 0 694 396 | 1/1996 | European Pat. Off. | ............ B41J 2/07 |
| 0694396A2 | 1/1996 | European Pat. Off. | ................ 347/1.1 |
| 0 863 004 | 9/1998 | European Pat. Off. | ............ B41J 2/04 |
| 8-318632 | 12/1996 | Japan | .................................. B41J 2/30 |
| WO 96/32263 | 10/1996 | WIPO | ...................................... 347/1.1 |
| WO 98/40222 | 9/1998 | WIPO | ............................ B41J 29/387 |

OTHER PUBLICATIONS

Patent Abstracts of Japan vol. 012, No. 045 (M–667) 2/10/88 & JP 62 198471 A (Mitsubishi Electric Corporation) Sep. 2, 1987 *Abstract.
Patent Abstracts of Japan vol. 012, No. 289 (M–728) 8/8/88 & JP 63 067164 A (Mitsubishi Electric Corporation) Mar. 25, 1988 *Abstract.
Patent Abstracts of Japan vol. 016, No. 051 (M–1209) Feb. 10, 1992 & JP 03 253351 A (Brother Ind Ltd) Nov. 12, 1991 *Abstract.

*Primary Examiner*—John S. Hilten
*Assistant Examiner*—Charles H. Nolan, Jr.
*Attorney, Agent, or Firm*—Sughrue, Mion, Zinn, Macpeak & Seas, PLLC

[57] ABSTRACT

A serial recording apparatus is disclosed which is capable of continuously printing even if a dot-forming element (or elements) of the element array of the recording head is defective, by substituting for the defective dot-forming element, a substitution dot-forming element. The serial recording apparatus also automatically detects a defective dot-forming element of the element array of the recording head. In operation, print data of the defective dot-forming element, which loses its dot-forming function, is saved in a second print-data storing device, and a first printing pass is carried out. In the second printing pass, a normal dot-forming element is moved to a location on a recording sheet which would otherwise be subjected to printing by the defective dot-forming element, and reads out the print data from the second print-data storing device to print it on that location.

28 Claims, 14 Drawing Sheets

FIG. 3

*** PRINT RESULT BY THE DOT-FORMING ***
CAPABILITY CHECK PROGRAM

IF NORMAL, DOTS ARE FORMED IN "CHECK RESULT" BELOW. (EX. • • • • •)

ELEMENT NO.   CHECK RESULT

```
DOT-FORMING CAPABILITY CHECK PROGRAM

[1]   DRIVE THE PROGRAM?

[ ] : YES
      [ ] : NO

[2]   IF YOU FIND A DOT-FORMING ELEMENT HAVING NO DOTS PRINTED,
      ENTER THE ELEMENT NUMBER OF THAT ELEMENT.

NUMBER OF THE DOT-FORMING ELEMENT HAVING NO DOTS : [    ]
      [ ] : ALL THE ELEMENTS HAVE DOTS PRINTED.

[3]   SUBSTITUTED BY A NORMAL DOT-FORMING ELEMENT?

[ ] : YES
      [ ] : NO
```

SERIAL RECORDING APPARATUS AND METHOD

FIELD OF THE INVENTION

This invention relates to a serial recording apparatus in which a recording head, which has a plural number of dot-forming elements arrayed in the paper feeding direction, is reciprocally moved across a recording sheet by a carriage, to thereby print dots on the recording sheet.

BACKGROUND OF THE INVENTION

In the serial recording apparatus (the apparatus is a recording apparatus in the sense that the apparatus records characters, graphics or the like on a recording medium, e.g., paper), a recording head has a plural number of dot-forming elements, which are linearly arrayed in the paper feeding direction. Those dot-forming elements may be impact dot wires, ink-jet nozzles, heat-generating elements, or the like. The dot-forming elements thus arrayed are selectively driven in accordance with the image data representative of patterns of characters, graphics and the like, and prints patterns of dots as the reproduction of the original patterns on a recording sheet. Sometimes, one or more of those dot-forming elements becomes defective to lose its dot forming capability.

In the print produced by the recording head including a defective dot-forming element, nothing is printed at the location printed by the defective dot-forming element, or if something is printed thereat, an optical density at the printed location is remarkably reduced. This leads to a reduction of the print quality.

When the dot-forming element or elements of the recording head are defective, it is necessary to repair the recording head or to replace the recording head with a new one. This costs a lot of time and labor. Further, the serial recording apparatus must be left inoperative during the repair and replacement of the recording head.

SUMMARY OF THE INVENTION

An object of the present invention is to provide a serial recording apparatus which is capable of continuously printing even if a dot-forming element (or elements) of the element array of the recording head is defective, by substituting for the defective dot-forming element, a substitution dot-forming element.

Another object of the present invention is to provide a serial recording apparatus which can automatically detect a defective dot-forming element of the element array of the recording head.

According to a first aspect of the present invention, there is provided a serial recording apparatus comprising: a recording head with a plural number of dot-forming elements; a paper feeding device for feeding a recording sheet; a first image data storing device for storing image data of the plurality of dot-forming elements; a second image data storing device for storing image data for a defective dot-forming element; and a control device for controlling the plural number of dot-forming elements so as to print in accordance with the image data read out from the first image data storing device, and for controlling the paper feeding device.

When one of the plural number of dot-forming elements is defective, the control device reads out the image data for the defective dot-forming element from the first image data storing device, and saves the readout image data into the second image data storing device, and selects a substitution dot-forming element from among the normal dot-forming elements, and causes the substitution dot-forming element to print a location on the recording sheet which would otherwise be subjected to printing by the defective dot-forming element, in accordance with the image data read out from the second image data storing device.

The serial recording apparatus thus constructed is able to produce a complete print result even if the element array of the recording head includes a defective dot-forming element since the defective dot-forming element is substituted by a substitution dot-forming element in the printing operation. In the serial recording apparatus, the image data is stored in the first image data storing device, and then the image data applied to the defective dot-forming element is stored in the second image data storing device. Usually, the number of defective dot-forming elements is very small, e.g., one or two. Therefore, the memory capacity of the second image data storing device is considerably smaller than that of the first image data storing device. In this respect, an increase of the memory capacity resulting from the substitution printing is negligible.

In the thus constructed serial recording apparatus, when the substitution printing is performed by use of the substitution dot-forming element, the control device reads out the image data for the defective dot-forming element from the second image data storing device and sets the readout image data as the image data for the substitution dot-forming element in the first image data storing device, sets non-dot-forming data (typically, it is 0) as the data for the dot-forming elements other than the substitution dot-forming element in the first image data storing device, and controls the plural number of dot-forming elements in accordance with the image data set in the first image data storing device. With this technical feature, substitution printing can be performed by driving the dot-forming elements as in normal printing.

According to a second aspect of the present invention, there is provided a serial recording apparatus comprising: a recording head with a plural number of dot-forming elements; a paper feeding device for feeding a recording sheet; an image data storing device for storing image data; a control device for controlling the plural number of dot-forming elements so as to print a document in accordance with the image data read out from the image data storing device, and for controlling the paper feeding device; and a defective element recognizing device for recognizing a defective dot-forming element included in the plural number of dot-forming elements at the time when no document printing is performed.

When the defective element recognizing device recognizes in advance a defective dot-forming element at the time of document printing, the control device selects a substitution dot-forming element from among the normal dot-forming elements of the plural number of dot-forming elements, and causes the selected substitution dot-forming element to print on a location on a recording sheet which would otherwise be subjected to printing by the defective dot-forming element, in accordance with the image data for the recognized defective dot-forming element, which is included in the image data stored in the image data storing device.

In this apparatus, the recognizing operation of the defective dot-forming element is not performed when the document is printed. In other words, the serial recording apparatus may perform only the printing of the document in a document print mode, while not performing the recognition of the defective dot-forming element. Thus, the decrease of the print throughput of the serial recording apparatus, which results from the additional operations for substitution printing, is minimized. The recognition of the defective dot-forming element may be performed either periodically, at the start-up of the serial recording apparatus, every time a predetermined amount of printing is carried out, or in response to a user's request. The defective dot-forming element may be recognized in the manner that the user enters the defective element number on the operation board or the host computer sends the same to the serial recording apparatus. Further, the recording apparatus tentatively drives the dot-forming elements to automatically specify the defective dot-forming element or elements.

According to a third aspect of the invention, there is provided a serial recording apparatus comprising: a recording head with a plural number of dot-forming elements; a paper feeding device for feeding a recording sheet; an image data storing device for storing image data; a control device for controlling the plural number of dot-forming elements so as to print swaths in accordance with the image data read out from the image data storing device, and for controlling the paper feeding device; and a defective element detecting device, provided with an image sensor, for automatically detecting a defective dot-forming element included in the plural number of dot-forming elements by reading the result of the printing by the plural number of dot-forming elements by the image sensor. When the defective element detecting device detects in advance a defective dot-forming element at the time of the swath printing, the control device selects a substitution dot-forming element from among the normal dot-forming elements of the plural number of dot-forming elements, and causes the selected substitution dot-forming element to print on a location on a recording sheet which would otherwise be subjected to printing by the defective dot-forming element, in accordance with the image data for the detected defective dot-forming element, which is included in the image data stored in the image data storing device.

The recording apparatus is able to automatically detect the defective dot-forming element by an image sensor and to perform substitution printing. Use of the resolution of the image sensor, which is comparable with the print resolution by the dot-forming elements, ensures a correct detection of the defective dot-forming element. The image sensor may also be used for reading out a picture including characters, graphics, etc., of a document, which is placed on the location of the recording sheet. In this case, the recording apparatus operates as the serial recording apparatus and the image reader as well.

According to a fourth aspect of the invention, there is provided a serial recording apparatus comprising: a recording head with a plural number of dot impact wires; a paper feeding device for feeding a recording sheet; an image data storing device for storing image data; a control device for controlling the plural number of dot impact wires so as to print swaths in accordance with the image data read out from the image data storing device, and for controlling the paper feeding device; and a defective wire detecting to device, provided with an impact wire sensor, for automatically detecting a defective impact wire included in the plural number of impact wires by detecting the impact magnitudes or the protruded distances of the plural number of impact wires. When the defective wire detecting device detects in advance a defective dot impact wire at the time of the swath printing, the control device selects a substitution dot impact wire from among the normal dot impact wires of the plural number of dot impact wires, and causes the selected substitution impact wire to print on a location on a recording sheet which would otherwise be subjected to printing by the defective dot impact wire, in accordance with the image data for the detected defective dot impact wire, which is included in the image data stored in the image data storing device.

The recording apparatus, or the impact recording apparatus, detects the impact magnitudes or the protruded distances of the plural number of impact wires, whereby a defective dot-forming element (or elements) is automatically detected and substitution printing is performed on the basis of its detection. A piezoelectric element, for example, may be used for detecting the impact magnitudes. Electrical contacts, an electrostatic capacitor sensor, or the like, may be used for detecting the protruded distances of the wires. Therefore, the detection of the defective dot-forming element is exact.

According to a fifth aspect of the invention, there is provided a serial recording apparatus comprising: a recording head with a plural number of dot-forming elements; a paper feeding device for feeding a recording sheet; an image data storing device for storing image data; a control device for controlling the plural number of dot-forming elements so as to print swaths in accordance with the image data read out from the image data storing device, and for controlling the paper feeding device; and a substitution element select device for selecting, when a defective dot-forming element is included in the plural number of dot-forming elements, a substitution dot-forming element being substituted for the defective dot-forming element from among the normal dot-forming elements of the plural number of dot-forming elements on the basis of the attribute of the normal dot-forming element.

When a defective dot-forming element is included in the plural number of dot-forming elements, at the time of swath printing, the control device causes the selected substitution dot-forming element to print on a location on a recording sheet which would otherwise be subjected to printing by the defective dot-forming element, in accordance with the image data for the defective dot-forming element, which is included in the image data stored in the image data storing device.

In the recording apparatus thus constructed, the optimum or approximately optimum substitution dot-forming element can be selected, since its selection is based on the attribute of the ordinarily used dot-forming element. The substitution dot-forming element thus selected is used for the substitution printing. Some methods to select the substitution dot-forming element on the basis of the attribute of the ordinarily used dot-forming element may be used for the invention.

A first method uses a frequency at which the normal dot-forming elements are used, for the attribute of the normal dot-forming element. Specifically, the normal dot-forming elements whose use frequencies are lower, are preferentially used for the substitution dot-forming elements.

A second method uses a positional relationship of the normal dot-forming elements to the defective dot-forming element, for the aid attribute of the normal dot-forming element. The normal dot-forming elements located downward of the defective dot-forming element are preferentially selected.

A third method uses priority levels assigned to the dot-forming elements for the attribute of the normal dot-forming element. The priority levels may be determined on the basis of the use frequency and the positional relationship of the normal dot-forming elements to the defective dot-forming elements.

In a case where a plural number of normal dot-forming elements are present, the substitution element select device preferentially selects a plural number of normal dot-forming elements having the same mutual positional relationship as that of a plural number of the defective dot-forming elements, for the substitution dot-forming elements. This fourth method minimizes the number of paper feedings, the number of print passes for the substitution printing, and hence minimizes the decrease of the print throughput.

According to a sixth aspect of the invention, there is provided a serial recording apparatus comprising: a recording head having a plural number of ordinarily used dot-forming elements and at least one substitution dot-forming element; a paper feeding device for feeding a recording sheet; an image data storing device for storing image data; and a control device for controlling the plural number of ordinarily used dot-forming elements so as to print swaths in accordance with the image data read out from the image data storing device, and for controlling the paper feeding device. When a defective dot-forming element is included in the plural number of ordinarily used dot-forming elements, at the time of the swath printing, the control device causes the substitution dot-forming element to print on a location on a recording sheet which would otherwise be subjected to the printing by the defective dot-forming element, in accordance with the image data for the defective dot-forming element, which is included in the image data stored in the image data storing device.

The thus constructed serial recording apparatus uses the substitution dot-forming element, which is provided exclusively for substitution printing. The location of the substitution dot-forming element, if properly selected, will provide easy control of the paper feeding. The substitution dot-forming elements may be all located downstream of the ordinarily used dot-forming elements. In this case, if any of the ordinarily used dot-forming elements is defective, the substitution dot-forming element selected is always located downward of the defective dot-forming element. This eliminates the need for paper feeding in the reverse direction. The substitution dot-forming element may be located near to (when viewed in the recording head advancing direction) the dot-forming elements which highly probably become defective. In this case, the substitution printing and the normal printing may be performed concurrently. No decrease of the print throughput occurs.

According to a seventh aspect of the invention, there is provided a serial recording apparatus comprising: a recording head having a plural number of ordinarily used dot-forming elements and at least one substitution dot-forming element; a paper feeding device for feeding a recording sheet; an image data storing device for storing image data; and a control device for controlling the plural number of dot-forming elements so as to print swaths in accordance with the image data read out from the image data storing device, and for controlling the paper feeding device. When a defective dot-forming element is included in the plural number of dot-forming elements, at the time of the swath printing, the control device performs normal printing in which the normal dot-forming elements of the plural number of dot-forming elements are driven to print the image data for the normal dot-forming elements read out from the image data storing device, and a substitution printing in which the image data which would otherwise be printed by the defective dot-forming element, is printed by a substitution dot-forming element selected from among the normal dot-forming elements, and the control device determines the order of executing the normal print and the substitution print, depending on whether the substitution dot-forming element is located upstream or downstream of the defective dot-forming element when viewed in the paper feeding direction.

This serial recording apparatus determines the order of executing the normal printing and the substitution printing depending on whether the substitution dot-forming element is located upstream or downstream of the defective dot-forming element. Therefore, the paper feeding direction is always forward in normal printing and substitution printing, irrespective of the selection of the substitution dot-forming element.

According to an eighth aspect of the invention, there is provided a serial recording apparatus comprising: a recording head having a plural number of ordinarily used dot-forming elements and at least one substitution dot-forming element; a paper feeding device for feeding a recording sheet; an image data storing device for storing image data; and a control device for controlling the plural number of dot-forming elements so as to print swaths in accordance with the image data read out from the image data storing device, and for controlling the paper feeding device. When a plural number of defective dot-forming elements are included in the plural number of dot-forming elements, at the time of the swath printing, the control device performs a substitution printing in which the image data for the plural number of defective dot-forming elements, which are contained in the image data stored in the image data storing device, are printed by a plurality of substitution dot-forming elements selected from among the normal dot-forming elements of the plural number of dot-forming elements, and in the substitution printing, the order of printing the image data for the defective dot-forming elements by the substitution dot-forming elements is determined depending on the distances from the defective dot-forming elements to the substitution dot-forming elements.

This serial recording apparatus can determine the order of performing the substitution printings by the substitution dot-forming elements on the basis of the distances ranging from the defective dot-forming elements to the corresponding substitution dot-forming elements. In the substitution printings by the substitution dot-forming elements, the directions of the paper feedings may be kept forward.

According to a ninth aspect of the invention, there is provided a serial recording apparatus comprising: a recording head having a plural number of ordinarily used dot-forming elements and at least one substitution dot-forming element; a paper feeding device for feeding a recording sheet; an image data storing device for storing image data; and a control device for controlling the plural number of dot-forming elements so as to print swaths in accordance with the image data read out from the image data storing device, and for controlling the paper feeding device.

When a defective dot-forming element is included in the plural number of dot-forming elements, the control device performs a substitution printing in which the image data which would otherwise be printed by the defective dot-forming element, is printed by a plural number of substitution dot-forming elements selected from among the normal dot-forming elements of the plural number of dot-forming elements. In this serial recording apparatus, a plural number of substitution dot-forming elements are used for one defective dot-forming element.

With this feature, the serial recording apparatus may effectively be applied to overlapping or interlacing printing.

The present invention further provides a host computer, which is compatible with the serial recording apparatus having the function of substitution printing by using the substitution dot-forming element (or elements) for the defective dot-forming element (or elements). The host computer receives information to specify a defective dot-forming element, entered by the user, and sends it to the serial recording apparatus. The recording apparatus recognizes the defective dot-forming element by the received information. With the method to inform the serial recording apparatus of the information, entered by the user, there is no need of additionally provided a defective element detecting device in the serial recording apparatus side.

The same thing is true for the case where the defective element number is entered by the user on the operation board. This does not produce any cost-up factors. This feature is very useful when considering the fact that the dot-forming elements rarely become defective. To make an easy check by the user as to which element is defective, it is preferable that the host computer includes a device instructing the serial recording apparatus to print a predetermined pattern. This device may be realized by the printer driver software or a printer monitor, usually. Such software may be installed or loaded to the host computer by a media, e.g., any of various disc type storages or semiconductor memories or a communication network.

BRIEF DESCRIPTION OF THE DRAWINGS

FIG. 3 is a diagram showing the print of a check pattern produced by a dot-forming capability check program;

FIG. 4 is a diagram showing a display presented on a screen when the dot-forming capability check program is being operated;

DETAILED DESCRIPTION OF THE PREFERRED EMBODIMENTS

The preferred embodiments of the present invention will be described with reference to the accompanying drawings.

Figure 1:
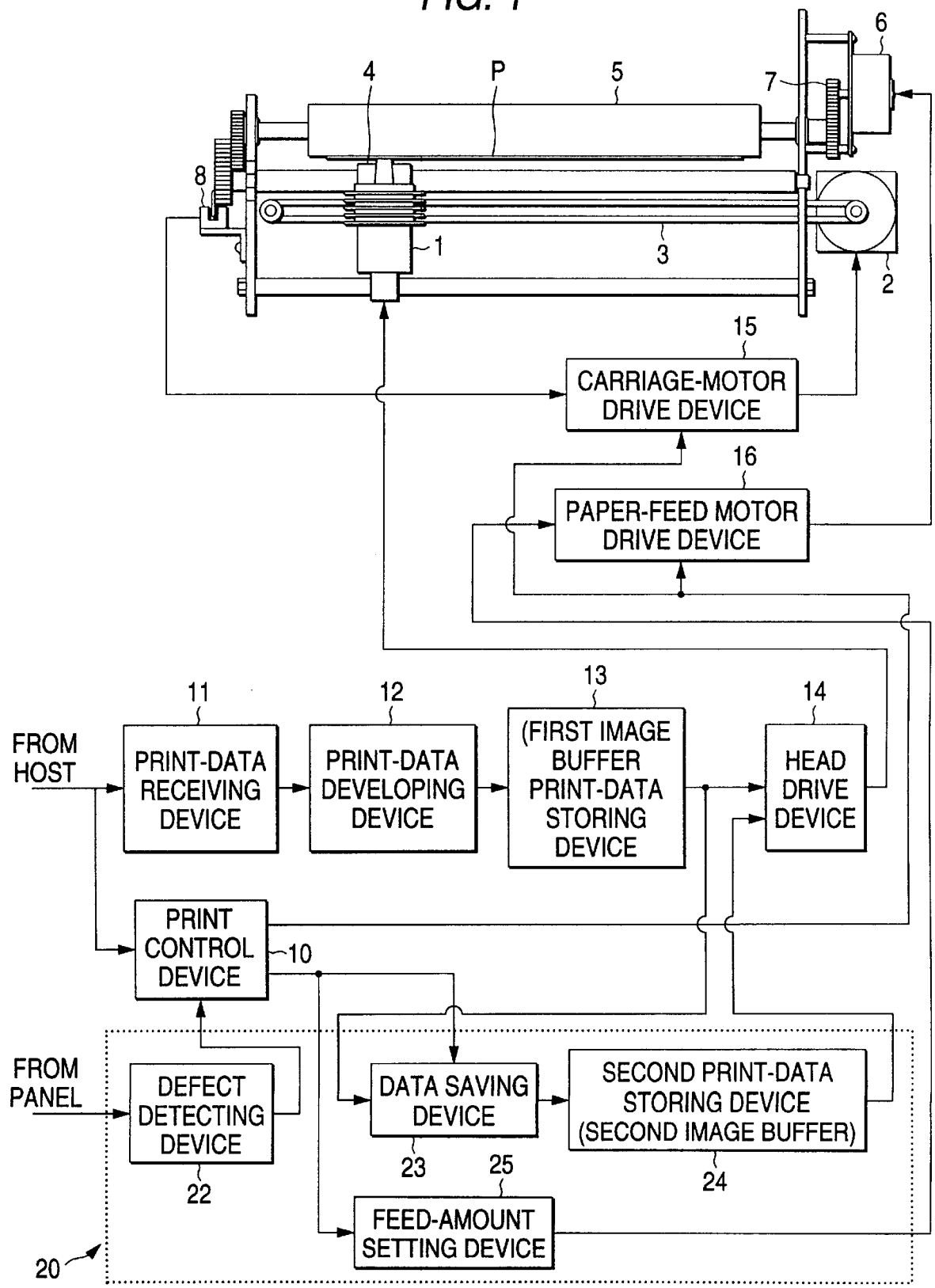
FIG. 1 is a block and schematic diagram showing a serial recording apparatus which is an embodiment of the present invention.
Figure 2:
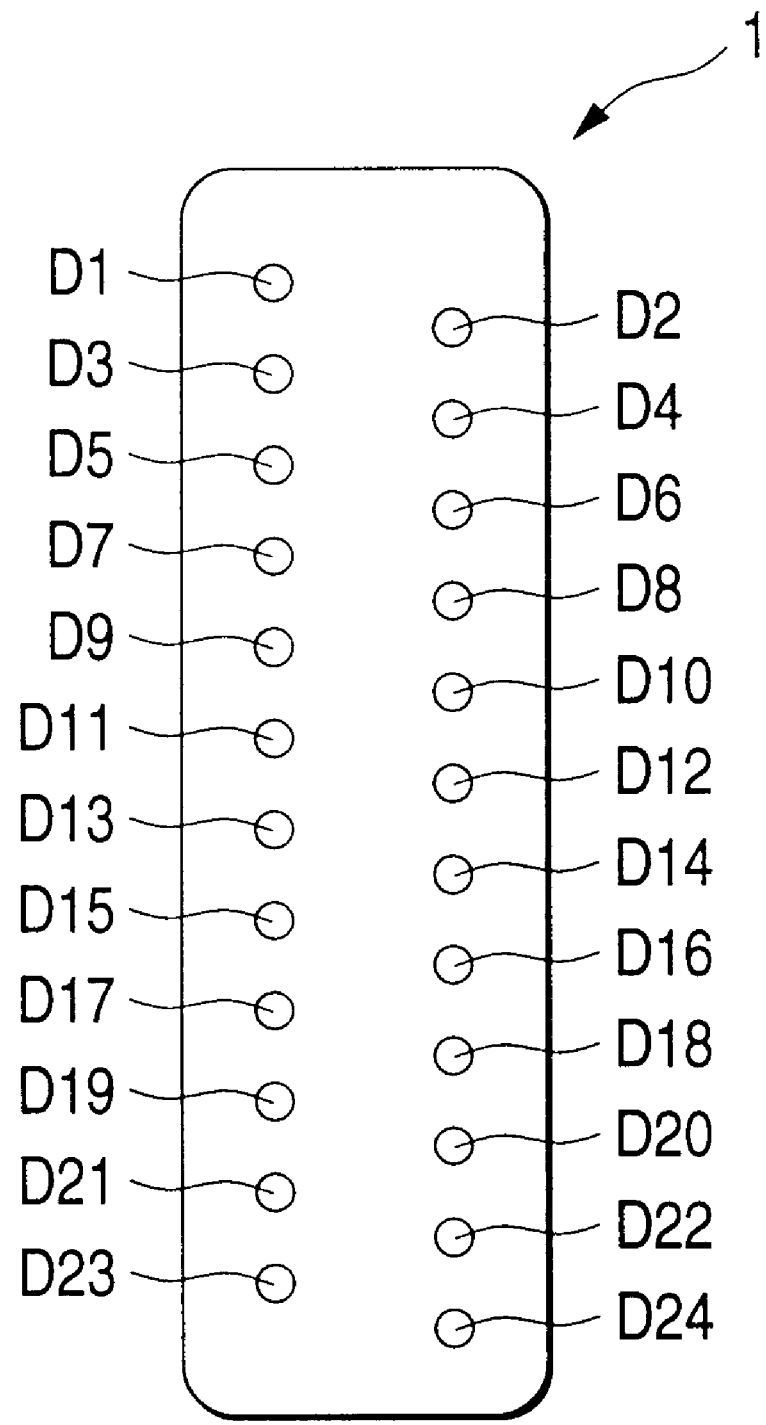
FIG. 2 is a diagram showing a recording head with two linear arrays each consisting of a plural number of dot-forming elements.

FIG. 1 shows an embodiment of the present invention. As shown in FIG. 2, a recording head 1 includes two linear arrays, each consisting of a plural number of dot-forming elements, which are linearly arrayed at fixed pitches. Those linear arrays are arranged side by side in the widthwise direction of a recording medium, e.g., recording sheet, while those dot-forming elements are arranged in a staggered fashion. In this embodiment, the dot-forming elements are impact wires. The recording head 1 is mounted on a carriage 4, which is dynamically coupled with a carriage drive motor 2 by a timing belt 3. The recording head 1, while being carried by the carriage 4, is reciprocally movable in the axial direction of a platen 5. The platen 5 is coupled with a paper-feed motor 6 by way of a gear chain 7, and the amount of feeding the recording sheet by the platen 5 is detected by an encoder 8.

A print control device 10 controls a print-data receiving device 11, a print-data developing device 12, a head drive device 14, a carriage-motor drive device 15, and a paper-feed motor drive device 16. The print-data receiving device 11 receives print data from a host computer. The print-data developing device 12 develops the character codes and graphic data, both being contained in the print data, into a bit map data, and processes a serial-parallel conversion of the data, whereby it generates image data suitable for driving the recording head 1 and outputs the resultant image to a print-data storing device 13. The head drive device 14 generates drive signals to drive the dot-forming elements D1 to D24 of the recording head 1. The carriage-motor drive device 15 drives the carriage drive motor 2 so as to reciprocally move the carriage 4, in response to a print signal. The paper-feed motor drive device 16 feeds a recording sheet P by preset amounts of paper feeding.

A substitution control unit 20, which is essential to the present invention, includes a defect detecting device 22, a data saving device 23, a second print-data storing device 24, and a feed-amount setting device 25. The defect detecting device 22 stores the ID of a dot-forming element, which is now defective, of the print data received from the host computer or the operation panel of the serial recording apparatus. The data saving device 23 saves the image data of a swath or line which should otherwise be printed by the defective dot-forming element, into the second print-data storing device 24. The feed-amount setting device 25 computes an amount of feeding of the recording sheet P necessary for the printing at a printing position, which is allocated to the defective dot-forming element, the printing being performed by the normal dot-forming element in place of the defective one.

When the functions necessary for printing are normal, the serial recording apparatus operates in the following way: when the print-data receiving device 11 receives print data from the host computer, the print control device 10 develops the print data, and outputs a drive signal to the recording head 1 while moving the recording head 1 at a fixed direction in the widthwise direction of the recording sheet P, and the recording head 1 forms dots on the recording sheet P by the dot-forming elements D1 to D24 thereof.

When the print is abnormal, the serial recording apparatus prints out a dot-forming capability check pattern as shown in FIG. 3 in response to an instruction issued from the host computer or an operator by operating, for example, an electronic panel (not shown) of the serial recording apparatus.

In a case where the instruction is issued from the host computer to the serial recording apparatus, a drive software to drive the serial recording apparatus is operated to present a display containing interactive messages as shown in FIG. 4 on a screen of the monitor of the apparatus.

From the dot-forming capability check pattern of FIG. 3, it is readily seen that an area to be printed by the dot-forming element D13 is blank, and therefore the dot-forming element D13 is defective. The defect detecting device 22 recognizes and stores therein an ID of the defective element D13 in response to an instruction, which is issued from the host computer or the panel operated by the operator on the basis of the fact that the dot-forming element D13 is defective. The defect detecting device 22, which has recognized the ID of the defective element, outputs the ID to the print control device 10.

In this case, in the serial recording apparatus, the print-data receiving device 11 receives print data from the host computer, and the print control device 10 develops the received print data into image data, and saves the image data to be printed by the defective dot-forming element D13 which should otherwise print a 13th line L13, into the second print-data storing device 24, and executes the printing by use of only the normal dot-forming elements.

Figure 5A:
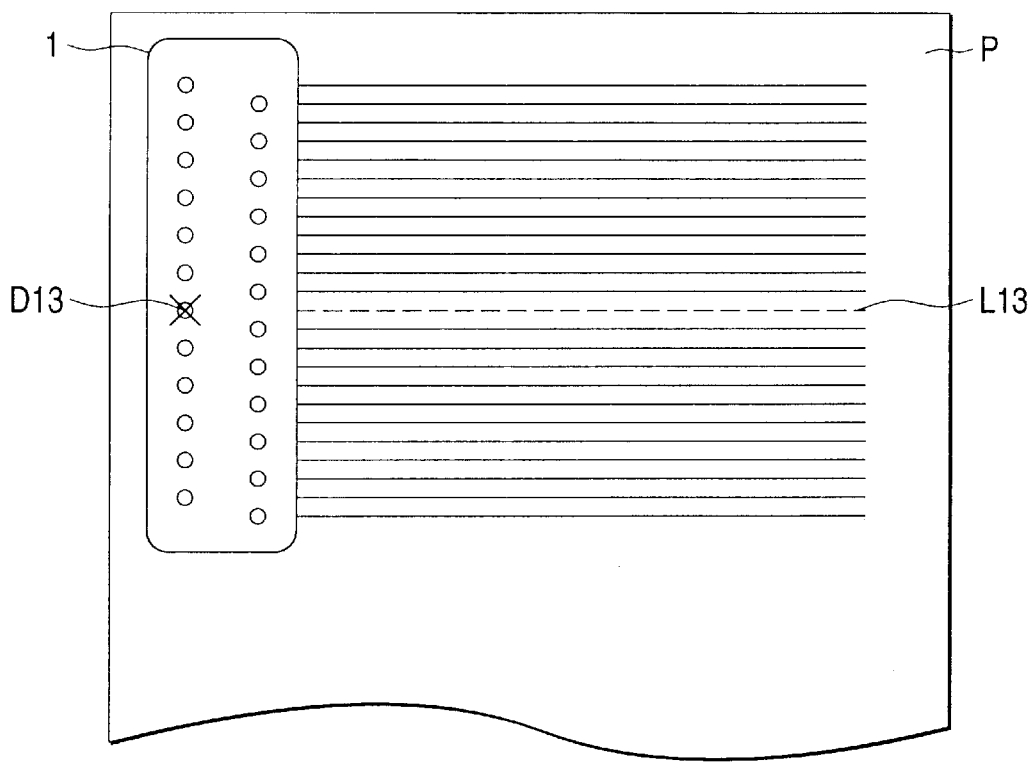
FIGS. 5A and 5B are diagrams for explaining a substitution printing executed by the serial recording apparatus.

The data to be output to the 13th dot-forming element D13 is originally stored in the print-data storing device 13. Therefore, there is no chance to operate the dot-forming element D13, and hence the printing operation is performed by use of only the normal dot-forming elements D1 to D12, and D14 to D24. Therefore, at the completion of the printing by those elements, the line L13 is left blank (FIG. 5A).

When the printing of one line is completed, the print control device 10 causes the feed-amount setting device 25 to compute an amount of paper feeding as small as possible but to such an extent as to secure a necessary paper-feeding accuracy, e.g., $\Delta W=6$ dots, till a normal dot-forming element, for example, the dot-forming element D7, approaches to and is confronted with the 13th line L13 which should otherwise be printed by the 13th dot-forming element D13, which is now defective. The feed-amount setting device 25 outputs the computed paper-feeding amount $\Delta W$ to the paper-feed motor drive device 16, which in turn 25 feeds the recording sheet P by the amount of $\Delta W$.

Figure 5B:
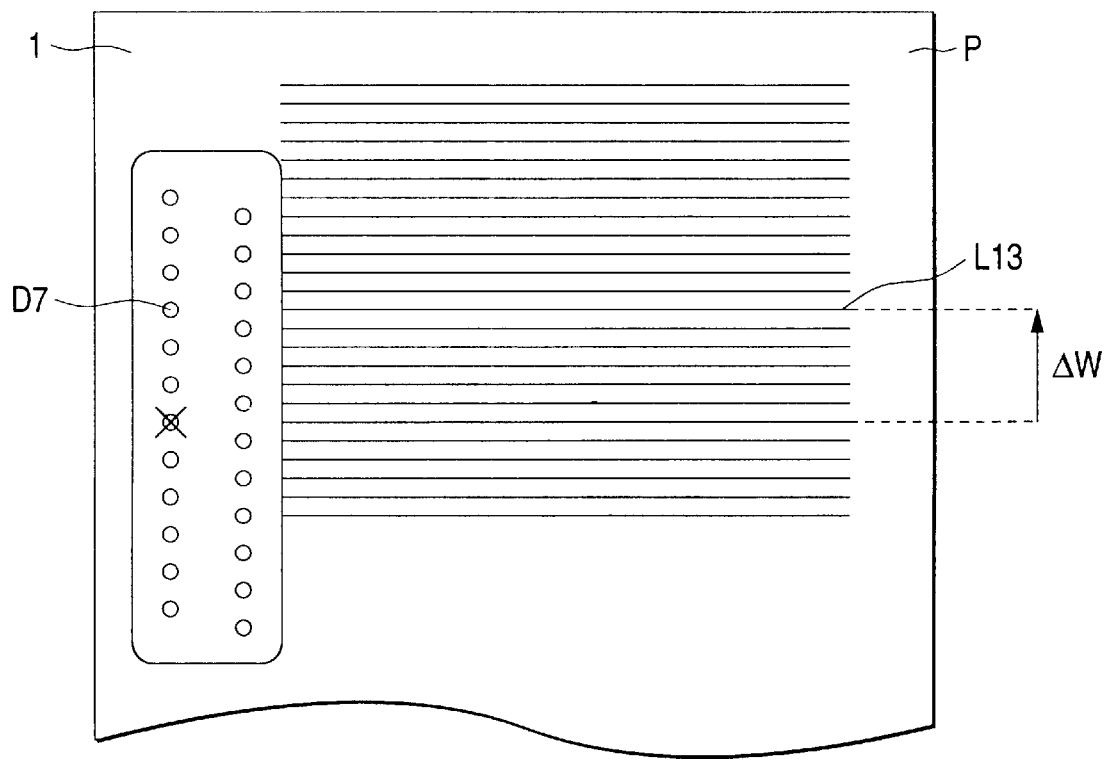

After the paper feeding ends, the print control device 10 reads the image data from the second print-data storing device 24 and outputs it to the dot-forming element D7 while moving the recording head 1 at the printing speed, so that the dot-forming element D7 prints the blank line L13, which is not printed in the first path. As a result, the serial recording apparatus can print out the data of one complete line even if the dot-forming element D13 is defective (FIG. 5B).

In this way, the printing of one line is carried out through two paths. At the end of the printing, the serial recording apparatus feeds the recording sheet P by a difference between the paper feeding amount $\Delta W$ by which the recording sheet P is fed at the initial stage of the second path printing, and a normal paper-feeding amount W; $W-\Delta W$. And then the apparatus executes the printing of the next line through two paths, and this sequence of printing operation is repeated.

If a plural number of dot-forming elements, for example, the elements D11 and D13, are defective, the print control device 10 saves the data of the lines L11 and L13, which are to be printed by those defective elements D11 and D13, into the second print-data storing device 24, and causes the serial recording apparatus to execute the 1st path printing by use of the dot-forming elements D1 to D10, D12, and D14 to D24. In the printing of the second path, the serial recording apparatus feeds the recording sheet P by such a paper-feeding amount (e.g., 4 dots) as to cover the lines L11 and L13, which should otherwise be printed by the defective dot-forming elements D11 and D13, by one time paper feeding, and the print data of two lines are printed by the normal dot-forming elements D15 and D17.

In a case where a plural number of dot-forming elements lose their printing functions, and one time paper feeding cannot correct the missing or the defective printing by those defective dot-forming elements, the correction printing process may be divided; for example, one line or swath may be printed by the second and third print passes.

Figure 6A:
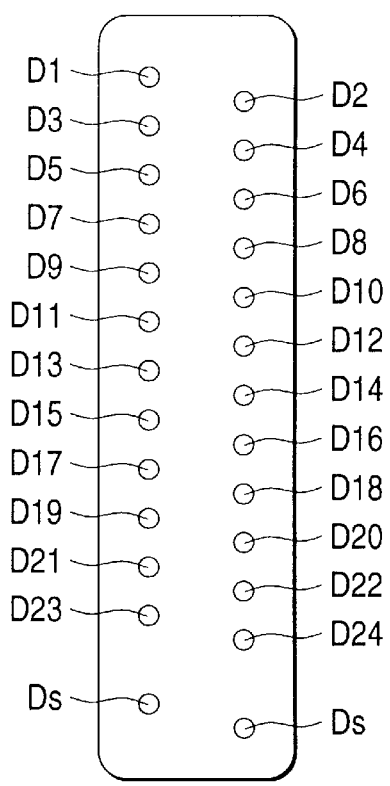
FIGS. 6A and 6B are diagrams showing other recording heads that may be used by the serial recording apparatus, those recording heads having different arrays of dot-forming elements.
Figure 6B:
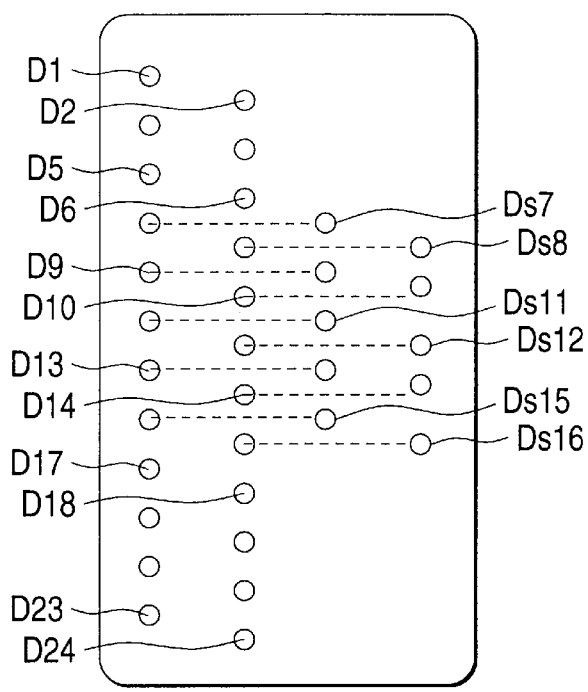

In the above description of the embodiment, the dot-forming elements D1 to D24, which are used for normal printing, are used for the substitution dot-forming element. Alternatively, one or a plural number of dot-forming elements may additionally be provided which are exclusively used for substitution of the defective dot-forming element as shown in FIGS. 6A and 6B. In the case of FIG. 6A, two substitution dot-forming elements Ds are located in the lower end of the recording head. Those elements may be located in the upper end of the recording head. In the case of FIG. 6B, substitution dot-forming elements Ds7 to Ds16 are respectively aligned with the dot-forming elements D7 (when viewed in the main scan direction) to D16, which are more frequently used, which are located in the middle region of the recording head. Those substitution dot-forming elements Ds, and Ds7 to Ds16 are used when one or more in number of those dot-forming elements Ds1 to D24 are defective and lose their printing function.

Figure 7A:
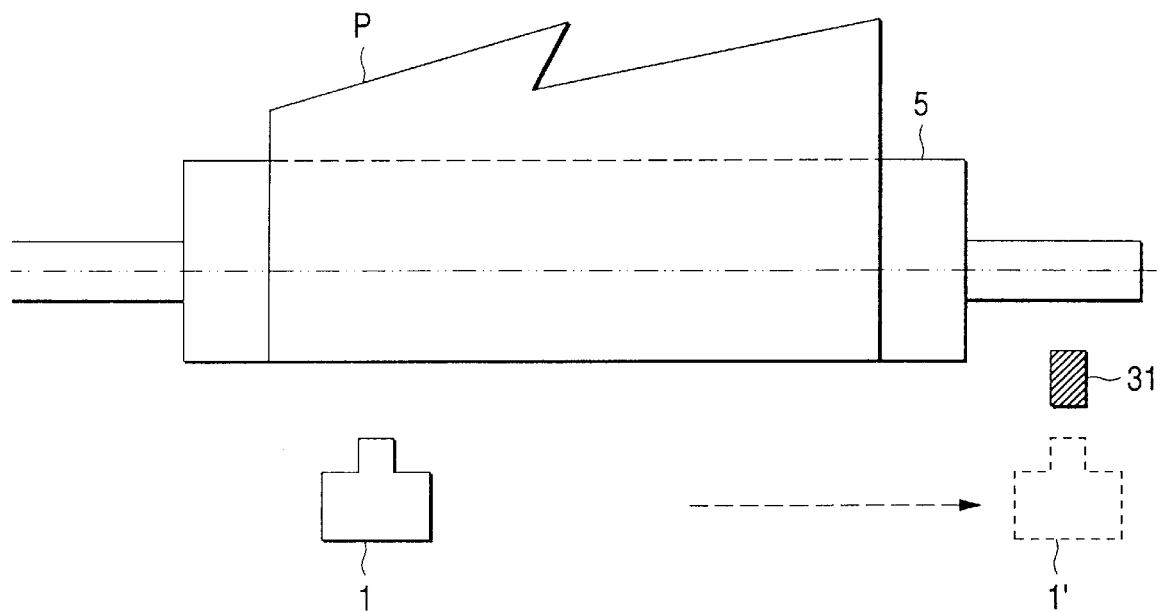
FIGS. 7A and 7B are plan and side views showing a structure for automatically detecting if the impact wires are normal.
Figure 7B:
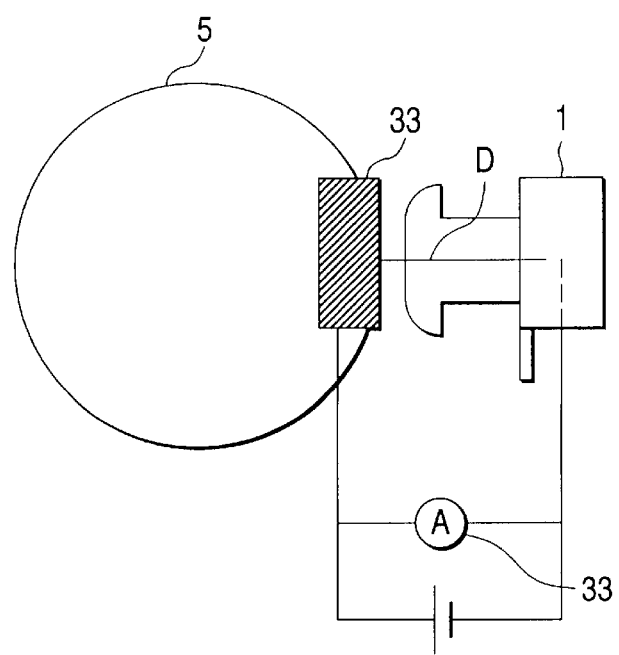

FIGS. 7A and 7B are plan and side views showing a structure including the recording head, the structure being capable of automatically detecting a defective dot-forming element.

The illustrated serial recording apparatus is an impact dot printer. The printer is provided with an electrode 31 for checking if the impact wire or wires of the recording head 1 are normal. When the recording head 1 is moved out of the front of a printing or recording sheet P that is put on the platen 5, and reaches a detecting position 1' (e.g., near the home position of the recording head), the recording head 1 is confronted with the electrode 31 while being in proximity to the latter. A part of the platen 5 may be used as the electrode 31. At the detecting position 1', a gap between the recording head 1 and the electrode 31 is selected such that when the recording head 1 is driven, a normal impact wire D comes in contact with the electrode 31, but a defective impact wire, for example, its tip being broken, does not reach the electrode 31. A voltage is applied to between the electrode 31 and the recording head 1 (impact wires), and a current sensor 33 is connected to this circuit, to detect if an electrical connection is set up therebetween.

In the printer incorporating thereinto the FIG. 7 structure for detecting if the impact wires are normal (this structure will be referred to as a "defective-element detecting structure"), either 1) periodically, 2) every time a given amount of printing is carried out, or 3) when the user requests the check about the dot forming capabilities of the dot-forming elements, i.e., impact wires, the printer operates as follows: the recording head 1 is moved to the detecting position 1'; the impact wires are successively driven; and the current sensor 33 checks if a current flows between the electrode 31 and each impact wire. The printer judges that the impact wire that allows a current to flow to or from the electrode 31 is normal, and the impact wire of no current flow is defective. On the basis of the result of the judgement, the printer substitutes the normal impact wire for the defective impact wire in the printing process as mentioned above.

A modification of the defective-element detecting structure follows. The impact wires are disposed to the electrode 31 such that the impact wires, even if they are normal, do not reach the electrode 31 with a small gap being therebetween. To detect the defective dot-forming element, an electrostatic capacitance between each impact wire and the electrode 31 is measured.

Figure 8:
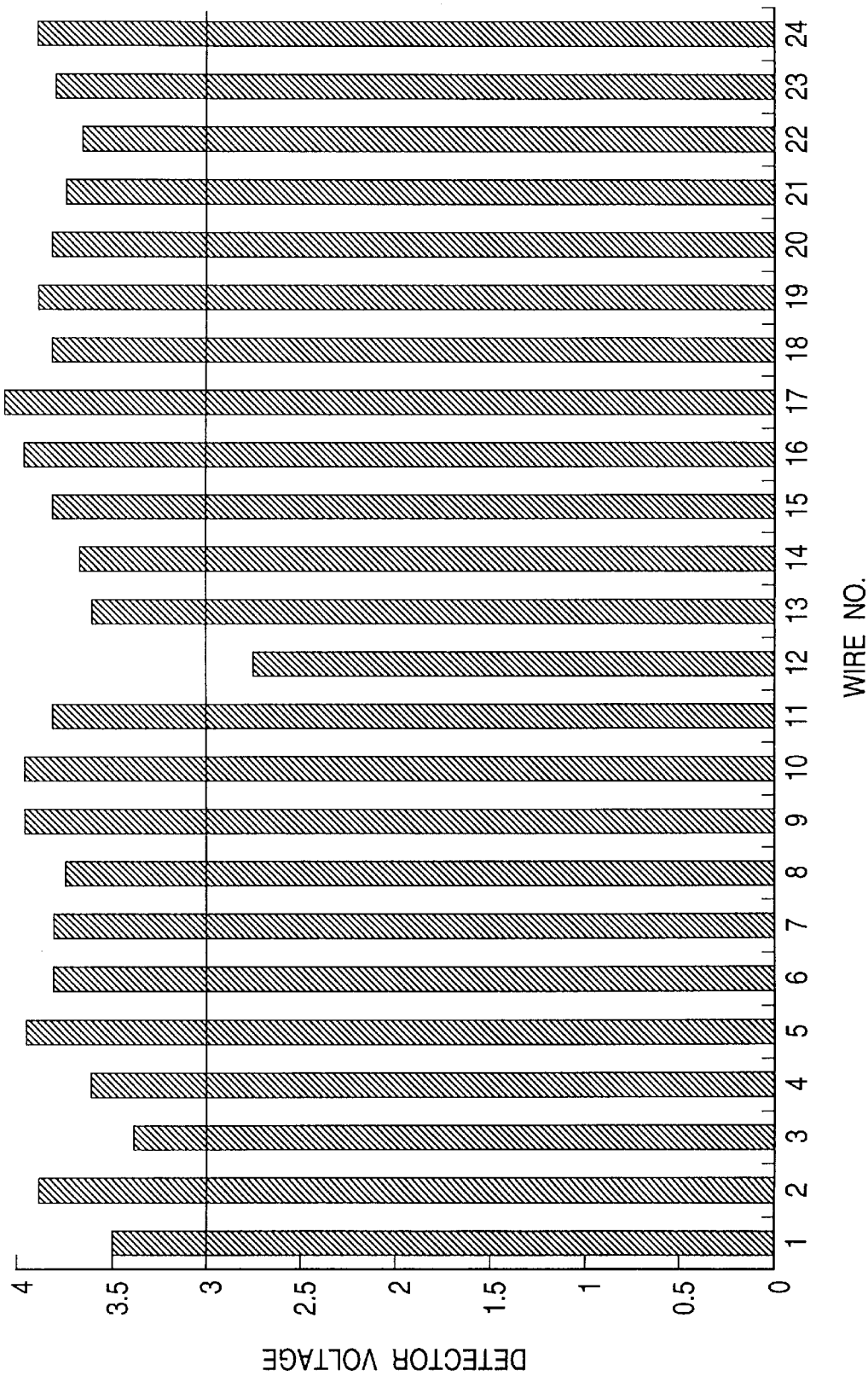
FIG. 8 is a graph showing voltages induced in a piezoelectric element by the impact wires of the recording head.

In another modification, the electrode 31 is replaced with a piezoelectric sensor, e.g., a piezoelectric element (also designated by numeral 31). In the modification, the piezoelectric element 31 is disposed such that when the recording head is moved to the detecting position 1', the piezoelectric element 31 is opposed to the recording head 1 while being in proximity with the recording head. Further, at this position 1', the recording head 1 is spaced from the piezoelectric element 31 such that when the recording head 1 is driven, the impact wires of the recording head 1 hit the surface of the piezoelectric element 31. When any of the impact wires hits the surface of the piezoelectric element 31, a voltage, which depends on the magnitude of the impact by the fitting, is induced into the piezoelectric element 31. An amplitude of the induced voltage is detected by a suitable voltage detecting device (not shown) properly connected thereto. Judgement of whether the impact wires are normal is based on the detected voltage. To check if the impact wires are normal, the amplitudes of the voltages induced into the piezoelectric element 31 are successively measured for all the impact wires, and compared with a threshold value of voltage amplitude. The amplitudes of the voltages induced into the piezoelectric element 31 for the impact wires No. 1 to No. 24 are depicted in a graph of FIG. 8. In the graph, the threshold level is set at 3. The impact wires causing the voltages having amplitudes above the threshold level 3 in the piezoelectric element 31 are judged to be normal, and the impact wires causing the voltages of the amplitudes below the threshold level, are judged to be defective. In this case, the amplitude of the voltage induced by the impact wire No. 12 is below the threshold level 3. Hence, the impact wire No. 12 is defective, and the remaining ones are all normal.

Figure 9:
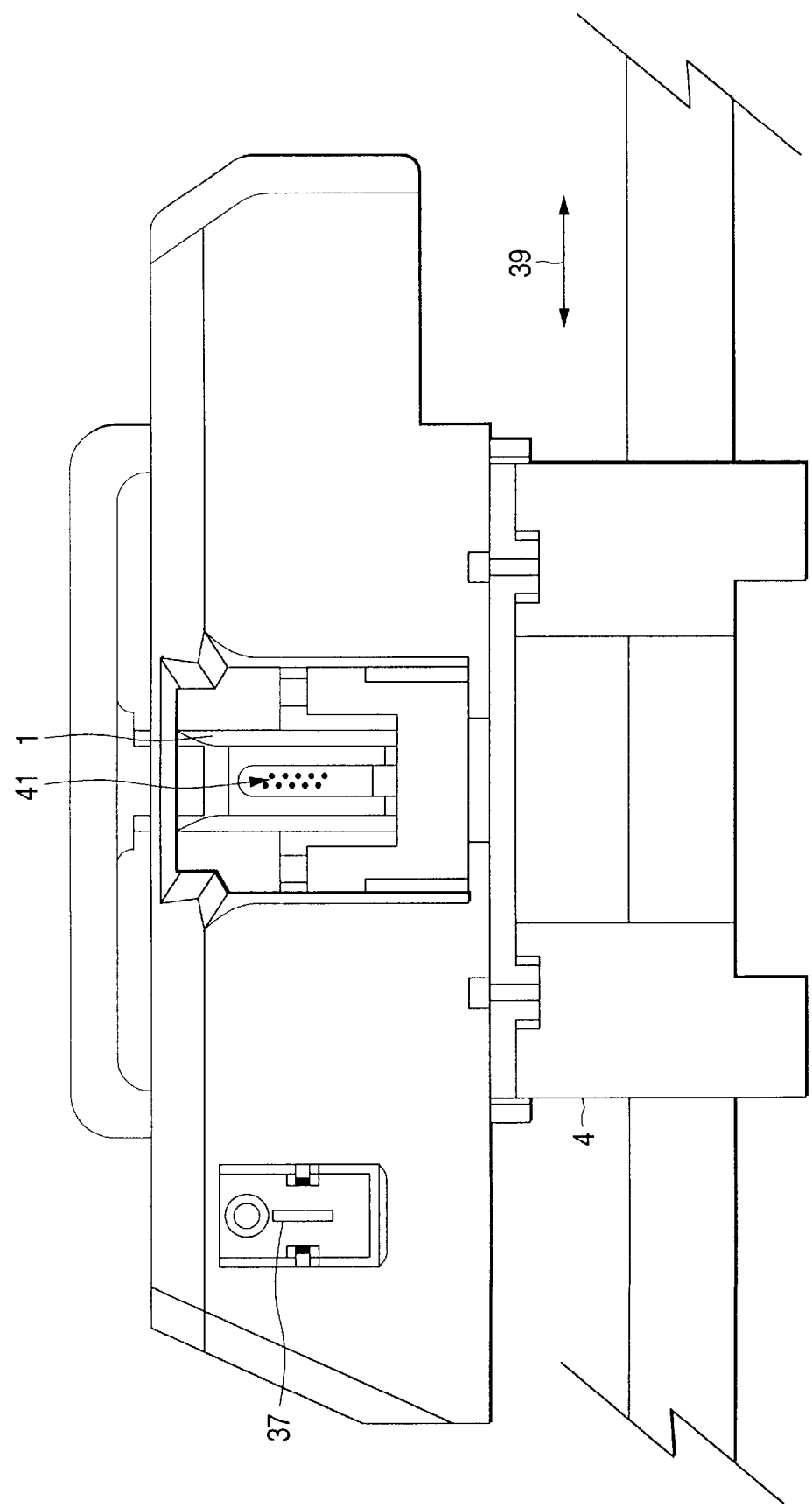
FIG. 9 is a front view showing another defective-element detecting structure.

A further modification of the defective-element detecting structure is illustrated in FIG. 9 in the form of a front view.

The structure may be applied to any type of serial recording apparatus, e.g., an impact dot printer, an ink-jet printer, and a thermal transfer printer. As shown, the recording head 1 is mounted on the carriage 4, and movable in the directions 39 with arrow heads. The structure includes a line image sensor 37 optically reading dots printed on a recording sheet. The line image sensor 37 is provided at a location somewhat deviated from the recording head 1 (when viewed in the directions 39). If required, the line image sensor 37 may be incorporated into the recording head 1 per se. In the structure, the line image sensor 37 is deviated from an array 41 of the dot-forming elements of the recording head 1 when viewed in the carriage moving directions 39. It is parallel to the element array 41, viz., it is at a right angle to the carriage moving direction 39 (parallel to the paper feeding direction). A resolution of the line image sensor 37 is equivalent to at least the pitches of the array 41 of the dot-forming elements when viewed in the paper feeding direction.

Figure 10:
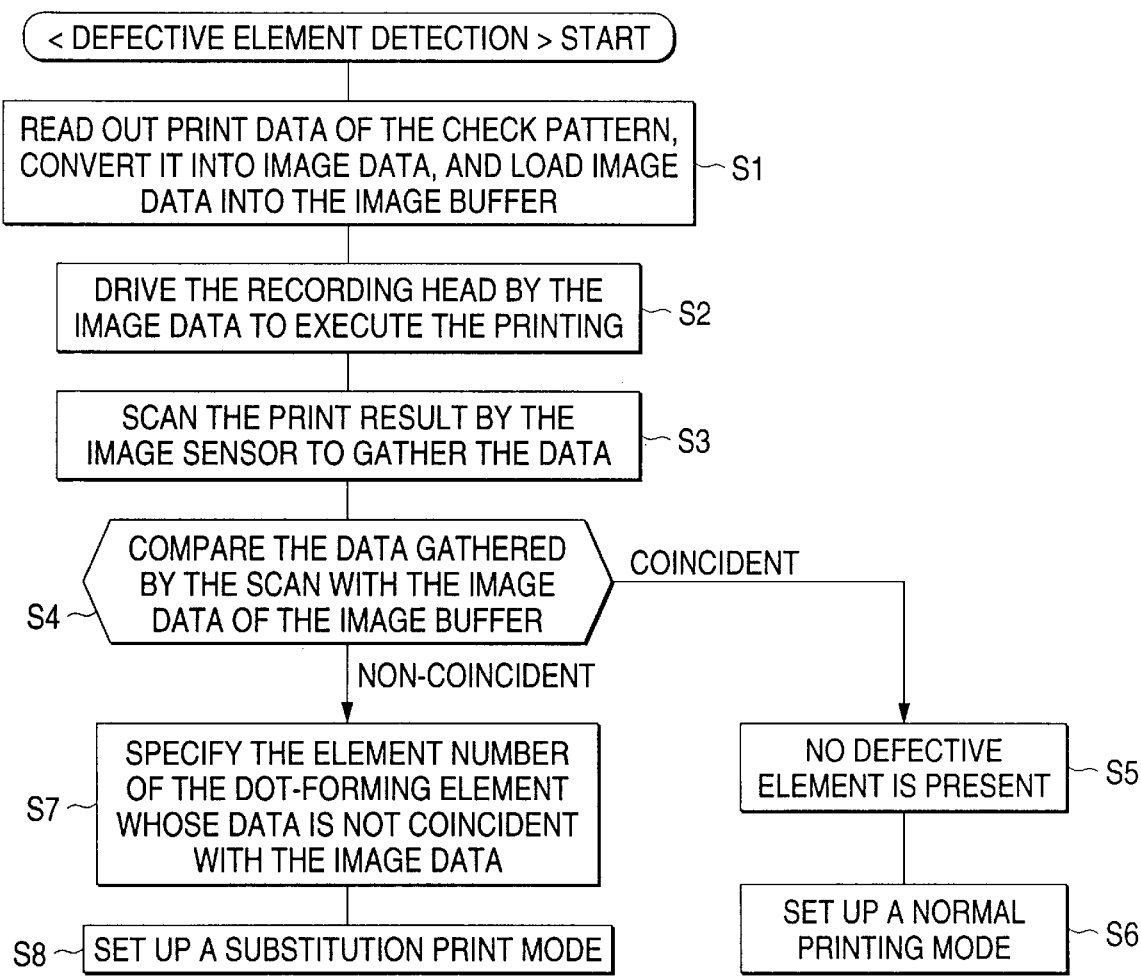
FIG. 10 is a flow chart showing a process flow to automatically detect if a defective dot-forming element is normal, by the FIG. 9 structure.

FIG. 10 is a flow chart showing a flow of a process to automatically detect a defective dot-forming element in the embodiment under discussion.

This defective element detecting process is executed, for example, when the user requests the printer to check if the dot-forming element is normal. The print control device 10 of the print control device reads out print data of a check pattern, which is programmed and stored in advance in a memory of the printer; it converts the print data to image data; and it stores the image data into an image buffer (step S1). Then, the print control device reads out the image data from the image buffer, and drives all the dot-forming elements of the recording head 1 by the image data, to thereby print the check pattern on the recording sheet (step S2). The print control device moves the carriage 4 to scan the printed check pattern with the line image sensor 37 and to read out the check pattern (step S3).

The print control device compares the readout check pattern data with the check pattern data of the image data used for the printing (step S4). If both the data are coincident with each other, the print control device judges that no defective dot-forming element is present (step S5), and sets up a normal printing mode (step S6). If those data are not coincident, the print control device judges that the dot-forming element corresponding to the dot, which is different from the corresponding dot in the reference data that is stored in advance in the printer memory, is defective, and specifies the number of the defective dot-forming element (step S7). And the print control device sets up a substitution mode to substitute the defective dot-forming element by a normal dot-forming element (step S8).

In the serial printer of the present embodiment, the line image sensor 37 may be used not only for detecting the defective dot-forming element but also for detecting an image from the recording sheet. Therefore, the serial printer has double functions: one is to print characters and the like on the recording sheet and the other is to read the same from the recording sheet.

Some methods, which may be used in the substitution mode, for selecting the candidates for the substitution dot-forming element, i.e., a normal dot-forming element to be substituted for the defective dot-forming element, will be described as follows.

A case where a single defective dot-forming element is detected will first be described.

Any one of the following methods for selecting a candidate for the substitution dot-forming element may be employed for the substitution mode.

The first substitution element selecting method follows. The frequencies at which the dot-forming elements are used in printing ordinary characters and numerals, are determined in advance. Those dot-forming elements are priority ordered from low to high use frequencies. The dot-forming element given the highest priority is first selected for the substitution dot-forming element, the dot-forming element given the priority next to the former is then selected, and so on. The use frequencies of the dot-forming elements are charted, by way of example, in FIG. 11. As seen, the dot-forming elements located close to the ends of the dot-forming element array are infrequently used. In the FIG. 11 case, the 1st dot-forming element whose use frequency is the lowest is selected for a candidate for the substitution dot-forming element at the highest priority, and the 2nd, 21st, 23rd, 24th, 3rd dot-forming elements and so on are selected for the candidate in this order. The reason why the dot-forming elements of low use frequencies are used for the candidate for the substitution dot-forming element at higher priority is that as the use frequency of the dot-forming element is lower, a probability that the dot-forming element becomes defective is lower, and therefore such a dot-forming element is suitable for the substitution dot-forming element. The usually available data may be used for the use frequencies, and if necessary, the frequencies at which the dot-forming elements are used are actually measured and the resultant data may be used for the use frequencies. This first method gives higher priorities to the dot-forming elements closer to the ends of the element array of the recording head.

Figure 11:
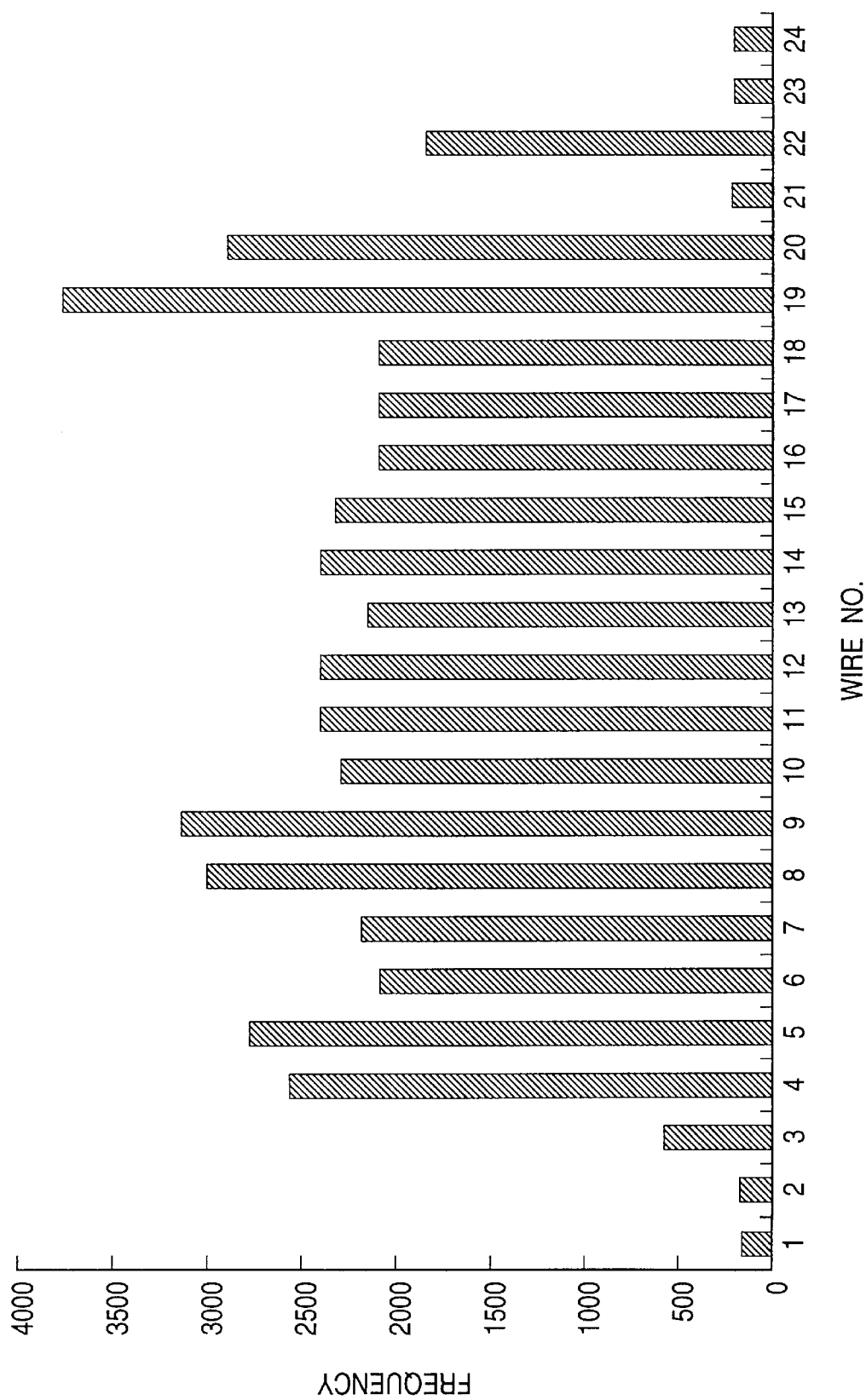
FIG. 11 is a graph showing a use frequency of dot-forming elements.

The second substitution element selecting method will be described. This second method uses the positions of the dot-forming elements in addition to the use frequencies thereof in selecting the candidates for the substitution dot-forming element. When a dot-forming element is defective, the dot-forming element, which is located downstream of the defective dot-forming element when viewed in the flow direction of the recording sheet, is desirably used for the substitution dot-forming element in order to minimize the adverse effect by a backlash by the paper transporting system. For this reason, higher priorities are assigned to the dot-forming elements which are located downstream and have lower use frequencies. In assigning the priority for the selection of the substitution dot-forming element, large emphasis is desirably put on the location of the defective dot-forming element than on the use frequency thereof. In the case of FIG. 11, the 1st dot-forming element is most infrequently used and located most downstream. Therefore, the top priority is assigned to this 1st dot-forming element, and the 2nd, 3rd, 6th, 7th dot-forming elements, . . . are successively lowered in priority level in this order. In this case, the 21st, 23rd and 24th dot-forming elements are low in use frequency but located upstream, and hence are relatively low in priority level.

The third substitution element selecting method determines the priority levels of the dot-forming elements on the basis of only the locations of those elements. That is, higher priority levels are assigned to the dot-forming elements located downward; the 1st, 2nd, 3rd dot-forming elements, . . . are priority ordered in this order, with the 1st dot-forming element being given the top priority level.

In any of those substitution element selecting methods, the priority levels are assigned in advance to the dot-forming elements, respectively. When a defective dot-forming element is present, of the normal dot-forming elements the element of the highest priority level is selected for the substitution dot-forming element.

Figure 12:
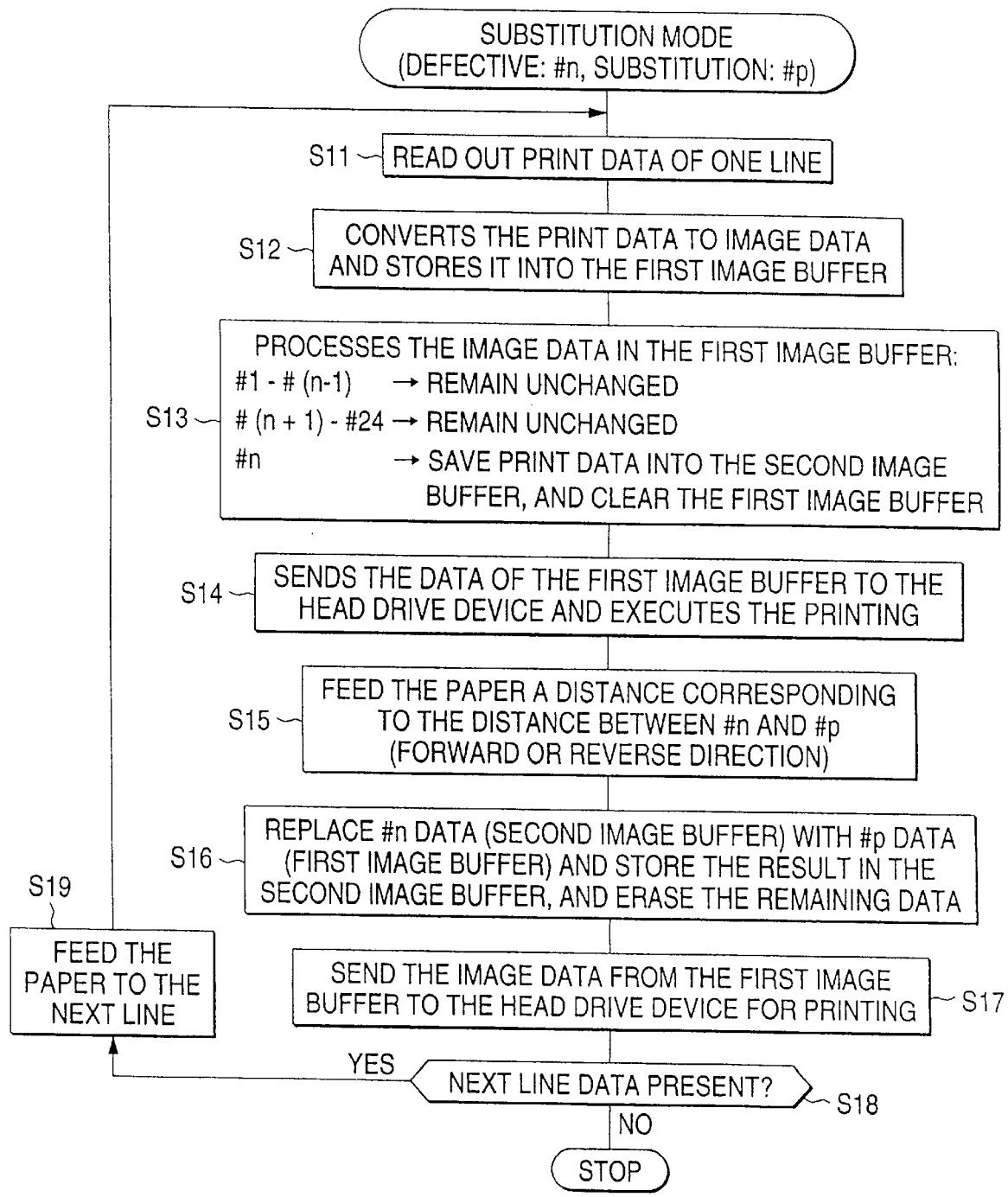
FIG. 12 is a flow chart showing a flow of the printing operation of the serial recording apparatus constructed as shown in FIG. 1, when the apparatus is in a substitution mode.

FIG. 12 is a flow chart showing a flow of the printing operation of the serial recording apparatus or printer constructed as shown in FIG. 1 when the apparatus is in a substitution mode. In the operation description to follow, it is assumed that the n-th dot-forming element is defective, and that the p-th dot-forming element is selected for the substitution dot-forming element that is to be used in place of the defective n-th dot-forming element.

To begin with, the print control device of the printer reads out print data of one line (which extends in the main scan (moving) direction of the recording head) from the memory of the printer (step S11); it converts the print data into image data to drive the recording head 1; and stores the image data into a first image buffer (print-data storing device) 13, which is allocated in advance to a specific memory area of the printer memory (step S12). The print control device reads out the data of the defective n-th dot-forming element from the first image buffer 13; it saves the readout data into a second image buffer, which is allocated in advance to a specific memory area of the printer memory; and it erases the data of the n-th dot-forming element in the first image buffer 13 (step S13). Then, it sends the data read out of the first image buffer 13 to the head drive device 14 whereby the data is printed by use of the normal dot-forming element (step S14).

The print control device feeds the recording sheet a distance between the defective n-th dot-forming element and the p-th dot-forming element as the substitution dot-forming element (step S15). The print control device reads out the image data of the n-th dot-forming element from the second image buffer (second print-data storing device) 24, and replaces the data of the p-th dot-forming element with the readout image data of the n-th dot-forming element in the first image buffer 13, and erases the data of the dot-forming elements other than the p-th dot-forming element in the first image buffer 13 (step S16). The print control device reads out the data stored anew in the first image buffer 13 and sends it to the head drive device 14, whereby the data is printed at the location on the recording sheet where should otherwise be subjected to the printing by the defective n-th dot-forming element (step S17).

Through the sequence of the printing steps, the print data of one line is completed. If the data of the next line is present (step S18), the print control device feeds the recording sheet to the next line (step S19), and repeats a similar printing process.

In the printing process mentioned above, the print data of each line are printed by the normal dot-forming elements (normal printing), and then the print data, which would otherwise be printed by the defective dot-forming element, are printed by the substitution dot-forming element (substitution printing). In a case where the second and third substitution element selecting methods are used, the substitution dot-forming element is located downstream of the defective dot-forming element, in most cases. When the printing operation is shifted from normal printing (by the normal dot-forming elements) to substitution printing (by the substitution dot-forming element) (step S15 in FIG. 12), the paper is frequently fed in the forward direction. This is desirable since the adverse effect by the backlash by the motor and the like is not produced.

A situation occurs where the normal dot-forming element located upstream of the defective dot-forming element is selected for the substitution dot-forming element. Such a case occurs not infrequently, in particular when the defective dot-forming element is located at the lower end of the array of the dot-forming elements. In this case, the paper is fed in the backward direction. Therefore, some measure to remove the backlash effect is necessarily taken. The printing speed is also slow. The problem may be solved by the following measures.

When the substitution dot-forming element is determined, a judgement is made as to whether the substitution dot-forming element is located downward or upward of the defective dot-forming element. If it is located downstream, substitution printing follows normal printing as mentioned above (FIG. 12). If it is located upstream, normal printing follows the substitution printing. In the latter case, in the step S13 in the FIG. 13 flow chart, the print control device saves the data of the normal dot-forming element into the second image buffer, and writes the data of the n-th dot-forming element into a memory location allocated to the data of the p-th dot-forming element in the first image buffer. In the step S16, the control device reads out the data of the normal dot-forming element from the second image buffer, and writes it in the second image buffer, and in the step S19, it feeds the paper to the position for the substitution print on the next line.

In the printing process of FIG. 12, after the print of one swath or line is completed, the printing of the next line is performed. The adjacent lines may be printed in an overlapping manner, if necessary. There is a case where when normal printing of a line is performed and then the substitution printing is performed, some dot-forming elements located in the upper portion of the element array are contained in a part of the next line. In this case, in the substitution printing, the data of the defective dot-forming element, which is read out of the second image buffer, is written, as the data of the substitution dot-forming element, into the first image buffer, and further the data to be printed on a part of the next line is written, as the data of the dot-forming elements occupying a part of the next line, into the first image buffer. Thus, the substitution printing and the printing of the data occupying a part of the next line can be performed by one print pass. This indicates that the data to be printed in the next print pass is only the data of the remaining next line or swath. The result is the increase of print throughput.

A case where a plural number of defective dot-forming elements are detected will be described. In this case, it is possible to employ the substitution element selecting method by which a plural number of dot-forming elements are preferentially selected for the substitution dot-forming elements in the order of the priority level. Where such a method is employed, a distance between a first defective dot-forming element and its associated substitution dot-forming element is different from that between a second defective dot-forming element and its associated substitution dot-forming element, and therefore one may encounter such a situation that during the printing of one line, it is necessary to feed the paper a number of times equal to the number of defective dot-forming elements, and to perform substitution printing the same number of times. To minimize the number of paper feedings and the number of substitution printings to thereby maximize the print throughput, use of the following substitution element selecting method is preferable. In this method, a plural number of normal dot-forming elements having the same mutual positional relationship as of a plural number of defective dot-forming elements is selected for the substitution dot-forming elements.

Figure 13:
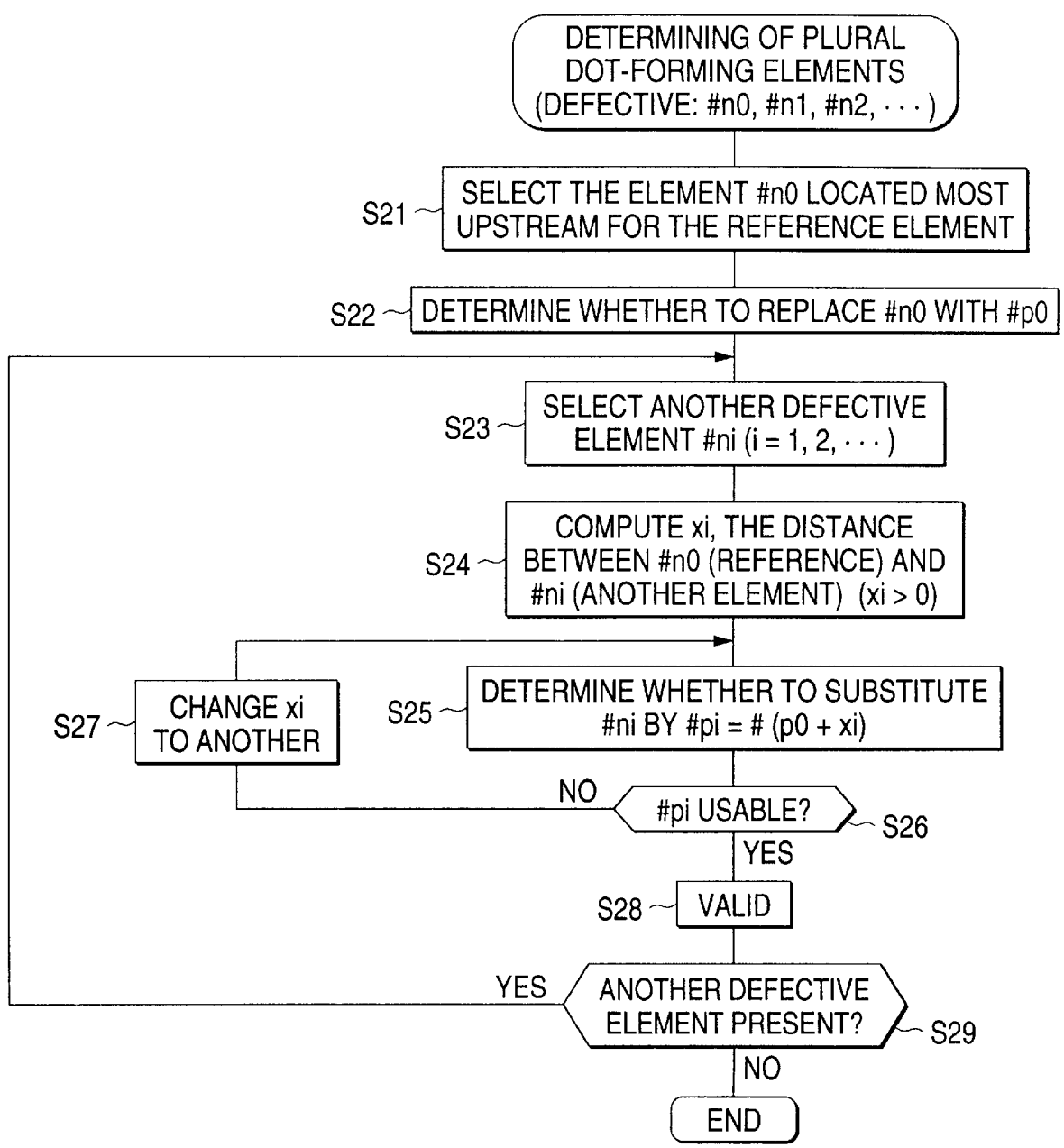
FIG. 13 is a flow chart showing a process flow of a substitution element selecting method based on the positions of the dot-forming elements.

FIG. 13 is a flow chart showing a process flow of a substitution element selecting method based on the positions of the dot-forming elements.

It is assumed that the n0-th, n1-th, n2-th dot-forming elements, . . . are detected as defective dot-forming elements. The defective dot-forming element located most upstream (e.g., n0-th dot-forming element) is selected for a reference element (step S21). One normal dot-forming element (e.g., p0-th dot-forming element) is used for the substitution dot-forming element for the n0-th dot-forming element (step S22). The substitution element selecting method used for the case of one defective dot-forming element, described above, may be used for the method for selecting the first substitution dot-forming element.

Next, another defective dot-forming element is selected (step S23). In this instance, the selected defective dot-forming element is the ni-th dot-forming element (i=positive integer). A paper feed distance xi between the n0-th dot-forming element of the reference element and the ni-th dot-forming element selected is computed (step S24). The (p0+xi)th dot-forming element (=Xi (distance)+p0 (the number of the substitution dot-forming element for the reference element) is determined to be the substitution dot-forming element for the ni-th dot-forming element (step S25). The print control device of the printer checks if the (p0+xi)th dot-forming element of the reference element can be used as the substitution dot-forming element, viz., it is normal (step S26). If it is abnormal or defective, the print control device alters the value of xi to another value (step S27), and returns to the step S25. The simplest method to alter the xi value is to erase the xi value (xi=0) (viz., the ni-th dot-forming element is substituted by the same number as p0 of the reference element). Another method is to increment the xi value; for example, xi=xi+1. Additional various methods may be used for the same purpose. If the (p0+xi)th dot-forming element is normal, this element is determined to be the substitution dot-forming element (step S28).

The sequence of the substitution element determining process steps (steps S23 to S28) is repetitively executed for all the defective dot-forming elements (step S29). By the substitution element selecting method described above, all or some of the defective dot-forming elements have the substitution dot-forming elements having the same positional relationships as of the former.

Figure 14:
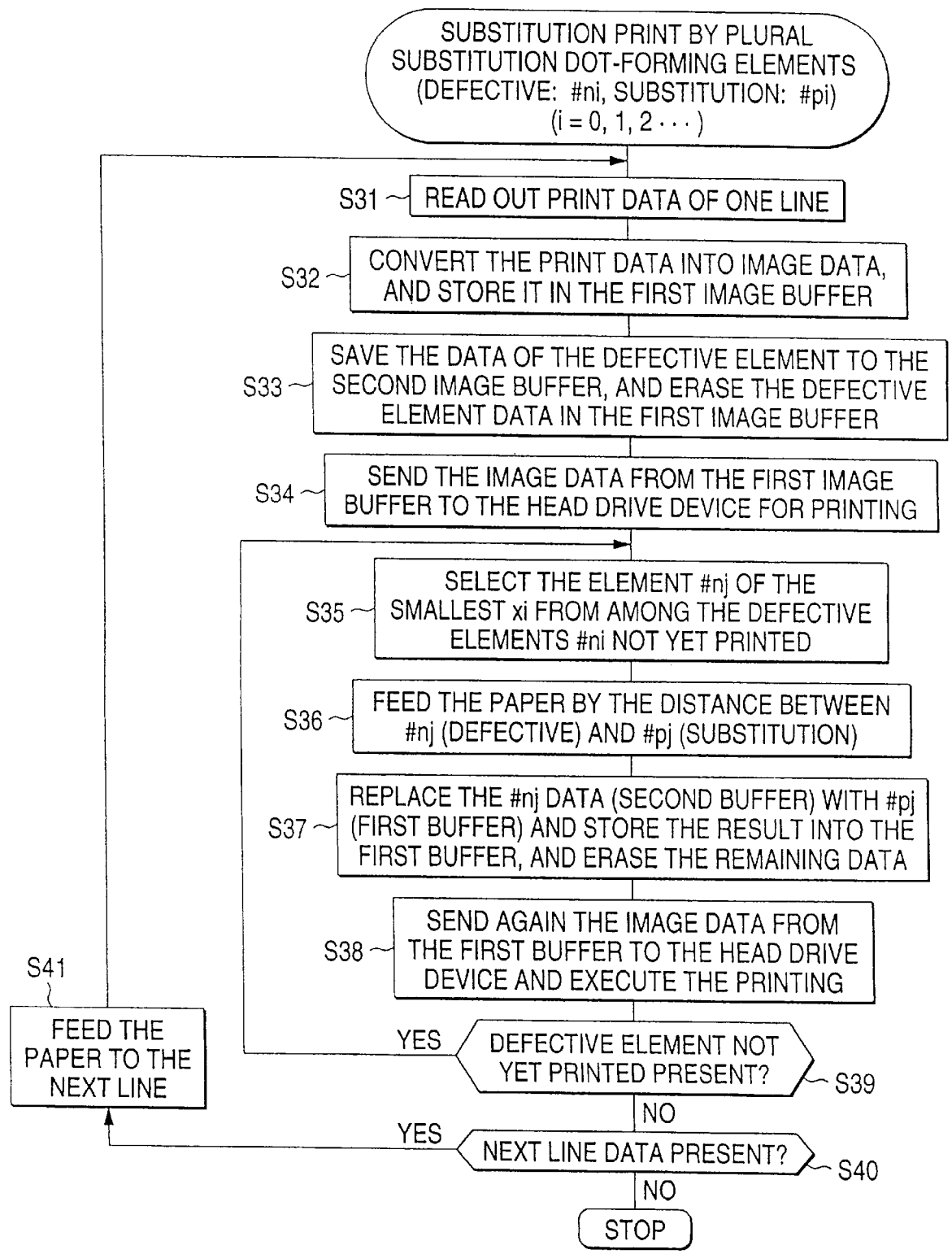
FIG. 14 is a flow chart showing the printing operation of the serial recording apparatus when the apparatus is in a substitution mode.

FIG. 14 is a flow chart showing the printing operation of the serial recording apparatus when the apparatus is in a substitution mode.

In the description of the printing operation, it is assumed that a plural number of the pi-th (i=positive integer) dot-forming elements is selected as the substitution dot-forming elements for a plural number of ni-th (i=positive integer) dot-forming elements which are defective.

In the serial printer, the print control device reads out the print data of one line from the printer memory (step S31); it converts the readout print data into image data for driving the recording head 1; and it stores the image data into the first image buffer (first print data storing device) 13, allocated to a memory area of the printer memory (step S32). Then, the print control device reads out the data of the ni-th (i=positive integer) dot-forming elements which are defective from the first image buffer 13; it saves the data into the second image buffer (second print data storing device) 24; and it erases the data of the ni-th (i=positive integer) dot-forming elements in the first image buffer 13. The print control device reads out the data from the first image buffer 13 and sends it to the head drive device 14, whereby the print data is printed by use of the normal dot-forming elements (step S34).

The print control device selects one defective dot-forming element whose distance (measured in the paper feed direction) ranging to the pi-th (i=positive integer) substitution dot-forming element associated with the former is the shortest, from among the ni-th (i=positive integer) defective dot-forming elements whose substitution printings are not yet performed (step S35). In this instance, the selected defective dot-forming element is the nj-th dot-forming element. A plural number of the nj-th dot-forming elements may be selected; and use of a plural number of them is preferable. In case where the substitution dot-forming elements are used, all the defective dot-forming elements are selected as the nj-th dot-forming elements, not infrequently.

Then, the paper is fed the distance xj between the nj-th defective dot-forming element and the pj-th substitution dot-forming element for the former (step S36). The print control device reads out the image data of the nj-th dot-forming element from the second image buffer (second print-data storing device) 24; it sends the data to the first image buffer 13 and replaces the data with the data of the pj-th dot-forming element; and it erases the data of the other dot-forming elements than the pj-th dot-forming element in the first image buffer 13 (step S37). Subsequently, the print control device reads out the data from the first image buffer 13 and sends it to the head drive device 14 whereby the printing by the pj-th dot-forming element is performed (step S38).

The print control device checks whether or not there is a defective dot-forming element whose substitution printing is not yet performed (step S39), and if such a dot-forming element is still present, the print control device returns to the step S35 and repeats the substitution printing for the defective dot-forming element.

When the substitution printings for all the defective dot-forming elements are completed, the printing operation of one line ends. If the data of the next line is present (step S40), the print control device feeds the recording sheet to the next line (step S41), and repeats a similar printing operation to print the next line or swath.

Also in the printing process mentioned above, the normal print is first performed and the substitution print is then performed. If required, the following printing manner may be used: the substitution print is first performed by the substitution dot-forming element located upstream of the defective dot-forming element, the normal printing is then performed, and the substitution printing by the substitution dot-forming element located downstream of the defective dot-forming element.

While a preferred embodiment of the invention has been described, the description of the embodiment is for illustrative purposes only, and it should be understood that changes and variations may be made without departing from the spirit and scope of the invention.

While one defective dot-forming element is substituted by one substitution dot-forming element in the above-mentioned embodiment, it may be substituted by a plural number of substitution dot-forming elements. This substitution printing method may be classified into two methods. The first substitution printing method follows. In this method, the line, which otherwise should be printed by the defective dot-forming element in one print pass, is printed by use of at least two substitution dot-forming elements. To explain the method more specifically, let us consider an example where a defective dot-forming element D1 is substituted by two substitution dot-forming elements D2 and D3. The recording sheet is fed so that the first substitution dot-forming element D2 is positioned at the line which otherwise should be printed by the defective dot-forming element. Every-two-dots data of the line data of the defective dot-forming element D1 is applied to the substitution dot-forming element D2, and the element D2 prints dots, every two dots, on the recording sheet. The paper is then fed so that the second substitution dot-forming element D3 is positioned at the same line. The remaining every-two-dots data of the line data of the defective dot-forming element D1 is applied to the substitution dot-forming element D3, and the element D3 prints dots each on the space between the adjacent dots printed by the element D2. The first substitution printing method is effective when it is applied to a so-called overlap print mode in which one line or swath is printed with two dot-forming elements to secure the print of high picture quality.

The second substitution printing method follows. In this method, the substitution dot-forming elements are selectively used for the print passes performed. For a certain print pass, the defective dot-forming element D1 is substituted by the first substitution dot-forming element D2, and for the next print pass, the element D1 is substituted by the second substitution dot-forming element D3. The second substitution printing method is effective when it is applied to a so-called interlace print mode for the printing of a high picture quality. Further, this method is frequently effective when it is applied to the above-mentioned case where in the substitution printing of one swath, a part of the next swath is also printed.

It is noted that the present invention is not limited to the preferred embodiments described above, and it is apparent that variations and modifications by those skilled in the art can be effected within the spirit and scope of the present invention as defined in the appended claims.

What is claimed is:

1. A serial recording apparatus comprising:
   a recording head with a plural number of dot-forming elements;
   a paper feeding device for feeding a recording sheet;
   a first image data storing device for storing image data for the plurality of dot-forming elements;
   a second image data storing device for storing image data for the a defective dot-forming element; and
   a control device for controlling the plural number of dot-forming elements so as to print in accordance with the image data read out from the first image data storing device, and for controlling the paper feeding device;
   wherein when one of the plural number of dot-forming elements is defective and a remainder are normal, the control device reads out the image data for the defective dot-forming element from the first image data storing device, and saves the readout image data into the second image data storing device, and selects a substitution dot-forming element from among the normal dot-forming elements, and causes the substitution dot-forming element to substitution print a location on the recording sheet which would otherwise be subjected to printing by the defective dot-forming element, in accordance with the image data read out from the second image data storing device;
   wherein the print of said plural number of dot-forming elements in accordance with the image data read out from the first image storing device is performed in a first operation, and the substitution printing to print only said substitution dot-forming elements is performed in a second operation.

2. The serial recording apparatus according to claim 1, wherein when the substitution dot-forming element performs the substitution printing, the control device reads out the image data for the defective dot-forming element from the second image data storing device and sets the read out image data as the image data for the substitution dot-forming element in the first image data storing device, sets non-dot-forming data as the data for the dot-forming elements other than the substitution dot-forming element in the first image data storing device, and controls the plural number of dot-forming elements in accordance with the image data set in the first image data storing device.

3. A serial recording apparatus comprising:
   a recording head with a plural number of dot-forming elements;
   a paper feeding device for feeding a recording sheet;

an image data storing device for storing image data;

a control device for controlling the plural number of dot-forming elements so as to print a document in accordance with the image data read out from the image data storing device, and for controlling the paper feeding device; and a defective element recognizing device for recognizing a defective dot-forming element among normal dot-forming elements included in the plural number of dot-forming elements, at a time when no document printing is performed;

wherein when the defective element recognizing device recognizes in advance a defective dot-forming element at a time of document printing, the control device selects a substitution dot-forming element form among the normal dot-forming elements of the plural number of dot-forming elements, and causes the selected substitution dot-forming element to print on a location on a recording sheet which would otherwise be subjected to printing by the defective dot-forming element, in accordance with the image data for the recognized defective dot-forming element, which is included in the image data stored in the image data storing device;

wherein the print of said plural number of dot-forming elements in accordance with the image data read out from the first image storing device is performed in a first operation, and a substitution printing to print only said selected substitution dot-forming element is performed in a second operation.

4. The serial recording apparatus according to claim 3, wherein the defective element recognizing device recognizes a defective dot-forming element in response to one of information entered by a user and received from a host computer.

5. The serial recording apparatus according to claim 3, wherein the defective element recognizing device tentatively drives the plural number of dot-forming elements to automatically detect a defective dot-forming element.

6. The serial recording apparatus according to claim 3, wherein one of periodically, every time a given amount of printing is carried out, and when the user requests the recognition of a defective dot-forming element, the defective element recognizing device carries out a process for recognizing the defective dot-forming element at a start-up of the serial recording apparatus.

7. A serial recording apparatus comprising:

a recording head with a plural number of dot-forming elements;

a paper feeding device for feeding a recording sheet;

an image data storing device for storing image data;

a control device for controlling the plural number of dot-forming elements so as to print swaths in accordance with the image data read out from the image data storing device, and for controlling the paper feeding device; and a defective element detecting device, provided with an image sensor, for automatically detecting a defective dot-forming element among normal dot-forming elements included in the plural number of dot-forming elements by reading the result of printing by the plural number of dot-forming elements by the image sensor;

wherein when the defective element detecting device detects in advance a defective dot-forming element at a time of the swath printing, the control device selects a substitution dot-forming element form among the normal dot-forming elements of the plural number of dot-forming elements, and causes the selected substitution dot-forming element to print on a location on a recording sheet which would otherwise be subjected to printing by the defective dot-forming element, in accordance with the image data for the recognized defective dot-forming element, which is included in the image data stored in the image data storing device;

wherein the swath printing of said plural number of dot-forming elements in accordance with the image data read out from the image storing device is performed in a first operation, and a substitution printing to print only said selected substitution dot-forming element is performed in a second operation.

8. A serial recording apparatus comprising:

a recording head with a plural number of dot impact wires;

a paper feeding device for feeding a recording sheet;

an image data storing device for storing image data;

a control device for controlling the plural number of dot impact wires so as to print swaths in accordance with the image data read out from the image data storing device, and for controlling the paper feeding device; and a defective wire detecting device, provided with an impact wire sensor, for automatically detecting a defective impact wire among normal impact wires included in the plural number of impact wires by detecting one of impact magnitudes and protruded distances of the plural number of impact wires;

wherein when the defective wire detecting device detects in advance a defective dot impact wire at a time of the swath printing, the control device selects a substitution dot impact wire from among the normal dot impact wires of the plural number of dot impact wires, and causes the selected substitution impact wire to print on a location on a recording sheet which would otherwise be subjected to the printing by the defective dot impact wire, in accordance with the image data for the defective dot impact wire, which is included in the image data stored in the image data storing device;

wherein the swath printing of said plural number of dot impact wires in accordance with the image data read out from the image storing device is performed in a first operation, and a substitution printing to print only said selected substitution dot impact wire is performed in a second operation.

9. A serial recording apparatus comprising:

a recording head with a plural number of dot-forming elements;

a paper feeding device for feeding a recording sheet;

an image data storing device for storing image data;

a control device for controlling the plural number of dot-forming elements so as to print swaths in accordance with the image data read out from the image data storing device, and for controlling the paper feeding device; and a substitution element select device for selecting, when a defective dot-forming element among normal dot-forming elements is included in the plural number of dot-forming elements, a substitution dot-forming element being substituted for the defective dot-forming element from among the normal dot-forming elements of the plural number of dot-forming elements on a basis of an attribute of one of the normal dot-forming elements;

wherein when a defective dot-forming element is included in the plural number of dot-forming elements, at a time of the swath printing, the control device causes the selected substitution dot-forming element to print on a location on a recording sheet which would otherwise be subjected to the printing by the defective dot-forming element, in accordance with the image data for the defective dot-forming element, which is included in the image data stored in the image data storing device;

wherein the swath printing of said plural number of dot-forming elements in accordance with the image data read out from the image storing device is performed in a first operation, and a substitution printing to print only said selected substitution dot-forming element is performed in a second operation.

10. The serial recording apparatus according to claim 9, wherein the attribute of the one of the normal dot-forming elements is a use frequency at which the normal dot-forming elements are used.

11. The serial recording apparatus according to claim 9, wherein the attribute of one of the normal dot-forming elements is a positional relationship of the normal dot-forming elements to the defective dot-forming element.

12. The serial recording apparatus according to claim 9, wherein the attribute of one of the normal dot-forming element is a priority level assigned to each of the dot-forming elements.

13. The serial recording apparatus according to claim 9, wherein when a plural number of the normal dot-forming elements are present, the substitution element select device preferentially selects a plural number of the normal dot-forming elements having the same mutual positional relationship as that of a plural number of the defective dot-forming element, for the substitution dot-forming elements.

14. A serial recording apparatus comprising:

a recording head having a plural number of ordinarily used dot-forming elements and at least one substitution dot-forming element;

a paper feeding device for feeding a recording sheet;

an image data storing device for storing image data; and a control device for controlling the plural number of ordinarily used dot-forming elements so as to print swaths in accordance with the image data read out from the image data storing device, and for controlling the paper feeding device; and wherein when a defective dot-forming element among normal dot-forming elements is included in the plural number of ordinarily used dot-forming elements, at a time of the swath printing, the control device causes the substitution dot-forming element to print on a location on a recording sheet which would otherwise be subjected to the printing by the defective dot-forming element, in accordance with the image data for the defective dot-forming element, which is included in the image data stored in the image data storing device;

wherein the swath printing of said plural number of ordinarily used dot-forming elements in accordance with the image data read out from the image storing device is performed in a first operation, and a substitution printing to print only said substitution dot-forming element is performed in a second operation.

15. A serial recording apparatus comprising:

a recording head having a plural number of ordinarily used dot-forming elements and at least one substitution dot-forming element;

a paper feeding device for feeding a recording sheet;

an image data storing device for storing image data;

a control device for controlling the plural number of dot-forming elements so as to print swaths in accordance with the image data read out from the image data storing device, and for controlling the paper feeding device;

wherein when a defective dot-forming element among normal dot-forming elements is included in the plural number of dot-forming elements, at a time of the swath printing, the control device performs a normal printing in which the normal dot-forming elements of the plural number of dot-forming elements are driven to print the image data for the normal dot-forming elements read out from the image data storing device, and a substitution printing in which the image data which would otherwise be printed by the defective dot-forming element is printed by a substitution dot-forming element selected from among the normal dot-forming elements, and the control device determines an order of executing the normal printing and the substitution printing depending on whether the substitution dot-forming element is located one of upstream and downstream of the defective dot-forming element when viewed in a paper feeding direction;

wherein the normal printing and said substitution printing are performed in different operations from one another.

16. A serial recording apparatus comprising:

a recording head having a plural number of ordinarily used dot-forming elements and at least one substitution dot-forming element;

a paper feeding device for feeding a recording sheet;

an image data storing device for storing image data; and a control device for controlling the plural number of dot-forming elements so as to print swaths in accordance with the image data read out from the image data storing device, and for controlling the paper feeding device;

wherein when a plural number of defective dot-forming elements among normal dot-forming elements are included in the plural number of dot-forming elements, at a time of the swath printing, the control device performs a substitution printing in which the image data for the plural number of defective dot-forming elements, which are contained in the image data stored in the image data storing device, are substitution printed by a plurality of substitution dot-forming elements selected from among the normal dot-forming elements of the plural number of dot-forming elements, and in the substitution printing, an order of printing the image data for the defective dot-forming elements by the substitution dot-forming elements is determined depending on distances from the defective dot-forming elements to the substitution dot-forming elements.

17. A serial recording apparatus comprising:

a recording head having a plural number of ordinarily used dot-forming elements and at least one substitution dot-forming element;

a paper feeding device for feeding a recording sheet;

an image data storing device for storing image data; and a control device for controlling the plural number of dot-forming elements so as to print swaths in accordance with the image data read out from the image data storing device, and for controlling the paper feeding device; and wherein when a defective dot-forming element among normal dot-forming elements is included in the plural number of dot-forming elements, the control device performs a substitution printing in which the image data which would otherwise be printed by the defective dot-forming element is printed by a plural number of substitution dot-forming elements selected from among the normal dot-forming elements of the plural number of dot-forming elements;

wherein the swath printing of said plural number of dot-forming elements in accordance with the image data read out from the image storing device is performed in a first operation, and the substitution printing to print only said substitution dot-forming elements is performed in a second operation.

18. A serial recording system including a host computer for generating print data and a serial recording apparatus for printing the print data received from the host computer, the serial recording apparatus comprising:

a recording head with a plural number of dot-forming elements;

a paper feeding device for feeding a recording sheet;

a first image data storing device for storing image data for the plurality of dot-forming elements;

an image data developing device for developing the print data into the image data and for storing the image data in the first image storing device;

a second image data storing device for storing image data for a defective dot-forming element; and a control device for controlling the plural number of dot-forming elements so as to print in accordance with the image data read out from the first image data storing device, and for controlling the paper feeding device;

wherein when one of the plural number of dot-forming elements which are normal dot-forming elements, is defective, the control device reads out the image data for the defective dot-forming element from the first image data storing device, and saves the readout image data in the second image data storing device, and selects a substitution dot-forming element from among the normal dot-forming elements, and causes the substitution dot-forming element to print at a location on the recording sheet which would otherwise be subjected to printing by the defective dot-forming element, in accordance with the image data read out from the second image data storing device;

wherein the print of said plural number of dot-forming elements in accordance with the image data read out from the first image storing device is performed in a first operation, and a substitution printing to print only said selected substitution dot-forming element is performed in a second operation.

19. A serial recording system including a host computer for generating print data and a serial recording apparatus for printing the print data received from the host computer, the serial recording apparatus comprising:

a recording head with a plural number of dot-forming elements;

a paper feeding device for feeding a recording sheet;

an image data storing device for storing image data;

an image data developing device for developing the print data into the image data and for storing the image data in the first image storing device;

a control device for controlling the plural number of dot-forming elements so as to print in accordance with the image data read out from the first image data storing device, and for controlling the paper feeding device; and a defective element recognizing device for recognizing a defective dot-forming element among normal dot-forming elements included in the plural number of dot-forming elements at a time when no document printing is performed;

wherein when the defective element recognizing device recognizes in advance a defective dot-forming element at a time of document printing, the control device selects a substitution dot-forming element from among the normal dot-forming elements of the plural number of dot-forming elements, and causes the selected substitution dot-forming element to print on a location on a recording sheet which would otherwise be subjected to printing by the defective dot-forming element, in accordance with the image data for the recognized defective dot-forming element, which is included in the image data stored in the image data storing device;

wherein the print of said plural number of dot-forming elements in accordance with the image data read out from the first image storing device is performed in a first operation, and a substitution printing to print only said selected substitution dot-forming element is performed in a second operation.

20. A serial recording system including a host computer for generating print data and a serial recording apparatus for printing the print data received from the host computer, the serial recording apparatus comprising:

a recording head with a plural number of dot-forming elements;

a paper feeding device for feeding a recording sheet;

an image data storing device for storing image data;

an image data developing device for developing the print data into the image data and for storing the image data in the image storing device;

a control device for controlling the plural number of dot-forming elements so as to print swaths in accordance with the image data read out from the image data storing device, and for controlling the paper feeding device; and a defective element detecting device, provided with an image sensor, for automatically detecting a defective dot-forming element among normal dot-forming elements included in the plural number of dot-forming elements, by reading the printing result of the plural number of dot-forming elements by the image sensor;

wherein when the defective element detecting device detects in advance a defective dot-forming element at a time of the swath printing, the control device selects a substitution dot-forming element from among the normal dot-forming elements of the plural number of dot-forming elements, and causes the selected substitution dot-forming element to print on a location on a recording sheet which would otherwise be subjected to printing by the defective dot-forming element, in accordance with the image data for the detected defective dot-forming element, which is included in the image data stored in the image data storing device;

wherein the swath printing of said plural number of dot-forming elements in accordance with the image data read out from the image storing device is performed in a first operation, and a substitution printing to print only said selected substitution dot-forming element is performed in a second operation.

21. A serial recording system including a host computer for generating print data and a serial recording apparatus for printing the print data received from the host computer, the serial recording apparatus comprising:

a recording head with a plural number of dot impact wires;

a paper feeding device for feeding a recording sheet;

an image data storing device for storing image data;

an image data developing device for developing the print data into the image data and for storing the image data in the image storing device;

a control device for controlling the plural number of dot impact wires so as to print swaths in accordance with the image data read out from the image data storing device, and for controlling the paper feeding device; and a defective wire detecting device, provided with an impact wire sensor, for automatically detecting a defective impact wire among normal impact wires included in the plural number of impact wires by detecting one of impact magnitudes and protruded distances of the plural number of impact wires;

wherein when the defective wire detecting device detects in advance a defective dot impact wire at a time of the swath printing, the control device selects a substitution dot impact wire from among the normal dot impact wires of the plural number of dot impact wires, and causes the selected substitution dot impact wire to print on a location on a recording sheet which would otherwise be subjected to printing by the defective dot impact wire, in accordance with the image data for the detected defective dot impact wire, which is included in the image data stored in the image data storing device;

wherein the swath printing of said plural number of dot impact wires in accordance with the image data read out from the image storing device is performed in a first operation, and then a substitution printing to print only said selected substitution dot impact wire is performed in a second operation.

22. A serial recording system including a host computer for generating print data and a serial recording apparatus for printing the print data received from the host computer, the serial recording apparatus comprising:

a recording head with a plural number of dot-forming elements;

a paper feeding device for feeding a recording sheet;

an image data storing device for storing image data;

an image data developing device for developing the print data into the image data and for storing the image data in the image storing device;

a control device for controlling the plural number of dot-forming elements so as to print swaths in accordance with the image data read out from the image data storing device, and for controlling the paper feeding device; and a substitution element select device for selecting, when a defective dot-forming element among normal dot-forming elements is included in the plural number of dot-forming elements, a substitution dot-forming element being substituted for the defective dot-forming element from among the normal dot-forming elements of the plural number of dot-forming elements on a basis of an attribute of one of the normal dot-forming elements;

wherein when a defective dot-forming element is included in the plural number of dot-forming elements, at a time of the swath printing, the control device causes the selected substitution dot-forming element to print on a location on a recording sheet which would otherwise be subjected to printing by the defective dot-forming element, in accordance with the image data for the defective dot-forming element, which is included in the image data stored in the image data storing device;

wherein the swath printing of said plural number of dot-forming elements in accordance with the image data read out from the image storing device is performed in a first operation, and then a substitution printing to print only said selected substitution dot-forming element is performed in a second operation.

23. A serial recording system including a host computer for generating print data and a serial recording apparatus for printing the print data received from the host computer, the serial recording apparatus comprising:

a recording head having a plural number of ordinarily used dot-forming elements and at least one substitution dot-forming element;

a paper feeding device for feeding a recording sheet;

an image data storing device for storing image data;

an image data developing device for developing the print data into the image data and for storing the image data in the image storing device;

a control device for controlling the plural number of ordinarily used dot-forming elements so as to print swaths in accordance with the image data read out from the image data storing device, and for controlling the paper feeding device;

wherein when a defective dot-forming element among normal dot-forming elements is included in the plural number of ordinarily used dot-forming elements, at a time of the swath printing, the control device causes the substitution dot-forming element to print on a location on a recording sheet which would otherwise be subjected to printing by the defective dot-forming element, in accordance with the image data for the defective dot-forming element, which is included in the image data stored in the image data storing device;

wherein the swath printing of said plural number of ordinarily used dot-forming elements in accordance with the image data read out from the image storing device is performed in a first operation, and then a substitution printing to print only said substitution dot-forming element is performed in a second operation.

24. A serial recording system including a host computer for generating print data and a serial recording apparatus for printing the print data received from the host computer, the serial recording apparatus comprising:

a recording head having a plural number of ordinarily used dot-forming elements and at least one substitution dot-forming element;

a paper feeding device for feeding a recording sheet;

an image data storing device for storing image data;

an image data developing device for developing the print data into the image data and for storing the image data in the image storing device; and a control device for controlling the plural number of dot-forming elements so as to print swaths in accordance with the image data read out from the image data storing device, and for controlling the paper feeding device;

wherein when a defective dot-forming element is included in the plural number of dot-forming elements, at a time of the swath printing, the control device performs a normal printing in which the normal dot-forming elements of the plural number of dot-forming elements are driven to print the image data for the normal dot-forming elements read out from the image data storing device, and a substitution printing in which the image data which would otherwise be printed by the defective dot-forming element is printed by a substitution dot-forming element selected from among the normal dot-forming elements, and the control device determines an order of executing the normal printing and the substitution printing depending on whether the substitution dot-forming element is located one of upstream and downstream of the defective dot-forming element when viewed in a paper feeding direction;

wherein the normal printing and said substitution printing are performed in different operations from one another.

25. A serial recording system including a host computer for generating print data and a serial recording apparatus for printing the print data received from the host computer, the serial recording apparatus comprising:

a recording head with a plural number of ordinarily used dot-forming elements and at least one substitution dot-forming element;

a paper feeding device for feeding a recording sheet;

an image data storing device for storing image data;

an image data developing device for developing the print data into the image data and for storing the image data in the image storing device; and a control device for controlling the plural number of dot-forming elements so as to print swaths in accordance with the image data read out from the image data storing device, and for controlling the paper feeding device;

wherein when a plural number of defective dot-forming elements among normal dot-forming elements are included in the plural number of dot-forming elements, at a time of the swath printing, the control device performs a substitution printing in which the image data for the plural number of dot-forming elements, which are contained in the image data stored in the image data storing device, are printed by a plurality of substitution dot-forming elements selected from among the normal dot-forming elements of the plural number of dot-forming elements, and in the substitution printing, an order of printing the image data for the defective dot-forming elements by the substitution dot-forming elements is determined depending on distances from the defective dot-forming elements to the substitution dot-forming elements;

wherein the print of said plural number of dot-forming elements in accordance with the image data read out from the image storing device is performed in a first operation, and a substitution printing to print only said selected substitution dot-forming elements is performed in a second operation.

26. A serial recording system including a host computer for generating print data and a serial recording apparatus for printing the print data received from the host computer, the serial recording apparatus comprising:

a recording head having a plural number of ordinarily used dot-forming elements and at least one substitution dot-forming element;

a paper feeding device for feeding a recording sheet;

an image data storing device for storing image data;

an image data developing device for developing the print data into the image data and for storing the image data in the image storing device; and a control device for controlling the plural number of dot-forming elements so as to print swaths in accordance with the image data read out from the image data storing device, and for controlling the paper feeding device;

wherein when a defective dot-forming element among normal dot-forming elements is included in the plural number of dot-forming elements, the control device performs a substitution printing in which the image data which would otherwise be printed by the defective dot-forming element is printed by a plural number of substitution dot-forming elements selected from among the normal dot-forming elements of the plural number of dot-forming elements;

wherein the print of said plural number of dot-forming elements in accordance with the image data read out from the image storing device is performed in a first operation, and a substitution printing to print only said selected substitution dot-forming elements is performed in a second operation.

27. A host computer being compatible with a serial recording apparatus, said host computer comprising:

a first device for instructing the serial recording apparatus to print a predetermined pattern;

a second device for displaying an information entering screen which allows a user to enter information;

wherein the serial recording apparatus comprises a plural number of dot-forming elements and a function wherein when a defective dot-forming element among normal dot-forming elements is included in the plural number of dot-forming elements, the image data, which would otherwise be printed by the defective dot-forming element, is printed by a substitution dot-forming element, which is selected from the normal dot-forming elements of the plural number of dot-forming elements; and wherein the host computer sends information to the serial recording apparatus, the information being entered by a user in the second device, to specify the defective dot-forming element included in the plural number of dot-forming elements; and wherein a print of said plural number of dot-forming elements is performed in a first operation, and a substitution printing to print only said substitution dot-forming elements is performed in a second operation.

28. A printing medium which can store a computer program for operating a computer as a host computer which is compatible with a serial recording apparatus, the computer program being accessible by the computer, the serial recording apparatus comprising:

a plural number of dot-forming elements and a function wherein when a defective dot-forming element among normal dot-forming elements is included in the plural number of dot-forming elements, the image data, which would otherwise be printed by the defective dot-forming element, is printed by a substitution dot-forming element, which is selected from the normal dot-forming elements of the plural number of dot-forming elements; and wherein the host computer sends information to the serial recording apparatus, the information being entered by a user, to specify the defective dot-forming element included in the plural number of dot-forming elements; and wherein a print of said plural number of dot-forming elements is performed in a first operation, and a substitution printing to print only said substitution dot-forming elements is performed in a second operation.

* * * * *